(12) United States Patent
Dolev et al.

(10) Patent No.: US 9,769,658 B2
(45) Date of Patent: Sep. 19, 2017

(54) CERTIFICATING VEHICLE PUBLIC KEY WITH VEHICLE ATTRIBUTES

(71) Applicants: Shlomi Dolev, Omer (IL); Nisha Panwar, Shaharanpur (IN); Michael Segal, Beer-Sheva (IL); Lukasz Krzywiecki, Wroclaw (PL)

(72) Inventors: Shlomi Dolev, Omer (IL); Nisha Panwar, Shaharanpur (IN); Michael Segal, Beer-Sheva (IL); Lukasz Krzywiecki, Wroclaw (PL)

(*) Notice: Subject to any disclaimer, the term of this patent is extended or adjusted under 35 U.S.C. 154(b) by 0 days.

(21) Appl. No.: 14/309,990

(22) Filed: Jun. 20, 2014

(65) Prior Publication Data

US 2015/0052352 A1 Feb. 19, 2015

Related U.S. Application Data

(60) Provisional application No. 61/838,284, filed on Jun. 23, 2013.

(51) Int. Cl.

| | |
|---|---|
| *H04W 12/06* | (2009.01) |
| *H04W 4/04* | (2009.01) |
| *H04L 9/32* | (2006.01) |
| *H04L 29/06* | (2006.01) |
| *H04W 12/04* | (2009.01) |
| *H04W 84/00* | (2009.01) |

(52) U.S. Cl.
CPC .......... *H04W 12/06* (2013.01); *H04L 9/3215* (2013.01); *H04L 9/3278* (2013.01); *H04W 4/046* (2013.01); *H04L 9/3268* (2013.01); *H04L 63/0823* (2013.01); *H04L 2209/84* (2013.01); *H04W 12/04* (2013.01); *H04W 84/005* (2013.01)

(58) Field of Classification Search
CPC .... H04W 12/06; H04L 9/3215; H04L 9/3278; H04L 9/3268
See application file for complete search history.

(56) References Cited

U.S. PATENT DOCUMENTS

| | | | |
|---|---|---|---|
| 8,290,211 B2 * | 10/2012 | Takahashi | 382/104 |
| 2004/0179848 A1 * | 9/2004 | Belenkii | 398/131 |
| 2008/0231418 A1 * | 9/2008 | Ophey et al. | 340/5.85 |
| 2009/0204808 A1 * | 8/2009 | Guo et al. | 713/155 |

(Continued)

*Primary Examiner* — Carl Colin
*Assistant Examiner* — Vance Little
(74) *Attorney, Agent, or Firm* — Roach Brown McCarthy & Gruber, P.C.; Kevin D. McCarthy

(57) ABSTRACT

A method for providing secure connection between vehicles. A unique pair of digitally signed public key and private key is provided to each vehicle, along with additional vehicle-related data. A certificate number is generated for each vehicle and the public key, the certificate number and the attributes of the vehicle is signed by a trusted certificate generating authority. Before communicating with a second vehicle, the first vehicle sends its unique certificate to a second vehicle; the second vehicle verifies the authenticity of received unique certificate number and visible attributes by a camera. If the attributes are verified successfully, the second vehicle sends its unique certificate number to the first vehicle, along with a secret key, which is valid for the current session only. Then the first vehicle verifies the authenticity of received certificate of the second vehicle and attributes by a camera that captures visible attributes of the second vehicle.

6 Claims, 11 Drawing Sheets

(56) References Cited

U.S. PATENT DOCUMENTS

2011/0083011 A1\* 4/2011 DiCrescenzo ................ 713/158
2012/0300930 A1\* 11/2012 Jutla ..................... H04L 9/0844
　　　　　　　　　　　　　　　　　　　　　　　　　380/262
2013/0339740 A1\* 12/2013 Ben-Shalom et al. ........ 713/175

\* cited by examiner

| |
|---|
| World Manufacturer Identifier: *Geographic Area, Country, Plant Code* |
| Vehicle Descriptor Section: *Model Year, Brand Logo, Body Style, Original Color and Texture, Color Repairs, Roof Racks, Foot Step, Mud Flap, Front and Rear Guard* |
| Vehicle Indicator Section: *Engine Number, Engine Type, License Number, Chassis Number* |
| GPS Device Identification |
| Wireless Device Fingerprint |
| Procedures to Execute for Verifying the Attributes |
| Certificate Sequence Number |
| Certificate Expiration Date |
| Public Key |
| Digital Signature |

Fig. 1

1. Sender $S$ sends the certificate $Cert_S = Attributes_S + Public\ keys \| E_{SK_{CA}}(H(Attributes_S + Public\ keys))$ to a neighbor $R$.
2. Receiver $R$ confirms the certificate $Cert_S$ authenticity as described in 2.(a) and then responds as detailed in 2.(b):
   (a) $R$ verifies the digital signature using the CA public key $PK_{CA}$, namely, $D_{PK_{CA}}[E_{SK_{CA}}(H(Attributes_S + Public\ keys))]$ and checks that indeed the result $H(Attributes_S + Public\ keys)$ is equal to the hash of $Attributes_S$ and $Public\ keys$, and then verifies $Attributes_S$ using out-of-band channels.
   (b) $R$ responds with the certificate $Cert_R = Attribute_R + Publickey_R \| E_{SK_{CA}}(H(Attribute_R + Publickey_R))$ along with a random string $key_r$ and certificate sequence number $SequenceNumber_S$ encrypted with $Public\ keys$ and digitally signed by $R$, i.e. $E_{Public\ keys}(key_r + SequenceNumber_S) \| E_{Public\ keys}(E_{SK_R}(H(key_r + SequenceNumber_S)))$.
3. Sender $S$ confirms the certificate $Cert_R$ authenticity as described in 3.(a) and then responds as detailed in 3.(b):
   (a) $S$ verifies the digital signature using the CA public key $PK_{CA}$, namely, $D_{PK_{CA}}[E_{SK_{CA}}(H(Attribute_R + Public\ key_R))]$ and checks that indeed the result $H(Attribute_R + Public\ key_R)$ is equal to the hash of $Attribute_R$ and $Public\ key_R$, and then verifies $Attribute_R$ using out-of-band channels.
   (b) $S$ decrypts the secret session key and certificate sequence number concatenated with the digital signature by using own secret key $SK_S$, i.e. $D_{SK_S}[E_{Public\ keys}(key_r + SequenceNumber_S)]$ resulting into $key_r$. Also the digital signature of $R$ is verified using $SK_S$ and $Publickey_R$ respectively, i.e. $D_{SK_S}(D_{Public\ key_R}(H(key_r + SequenceNumber_S)))$ that results into $H(key_r + SequenceNumber_S)$. Now the hashing algorithm $H$ is applied with $key_r + SequenceNumber_S$ and then compared with the hashed string $H(key_r + SequenceNumber_S)$ produced from the digital signature. If the both hash strings are same and the symmetric padded zero composition $key_r + SequenceNumber_S$ is valid then $key_r$ is accepted as a valid session key.
4. Sender and receiver exchange encrypted messages using $key_r$ as a shared secret key for $S$ and $R$.

Fig. 2

| World Manufacturer Identifier |
| --- |
| (geographic area, country, plant code) |
| Vehicle Descriptor Section |
| (model year, brand logo, body style, original color and texture, color repairs, roof racks, foot step, mud flap, front and rear guard) |
| Vehicle Indicator Section |
| (engine number, engine type, license number, chassis number) |

| Wireless Device Fingerprint | GPS Device Identification |
| --- | --- |
| Procedures to Execute for Verifying the Attributes ||
| Certificate Expiration Date | Certificate Sequence Number |
| Public Key ||
| Digital Signature ||

Fig. 9

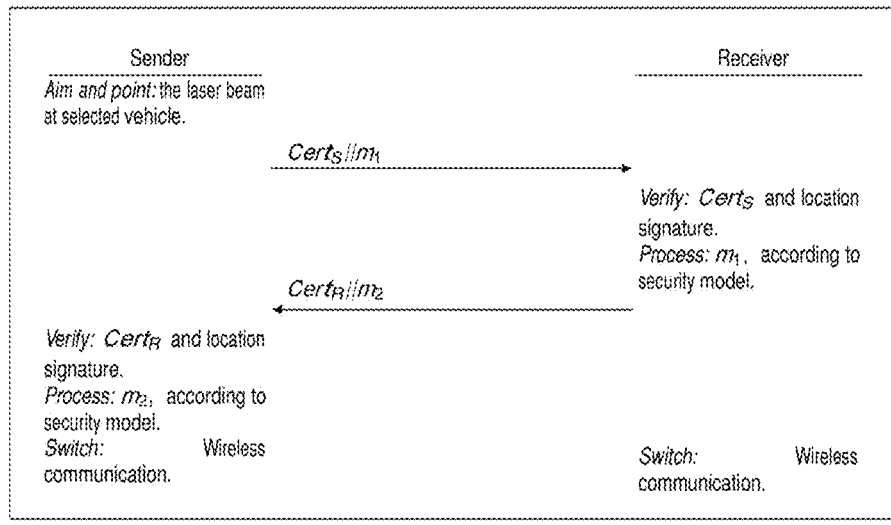

Fig. 10

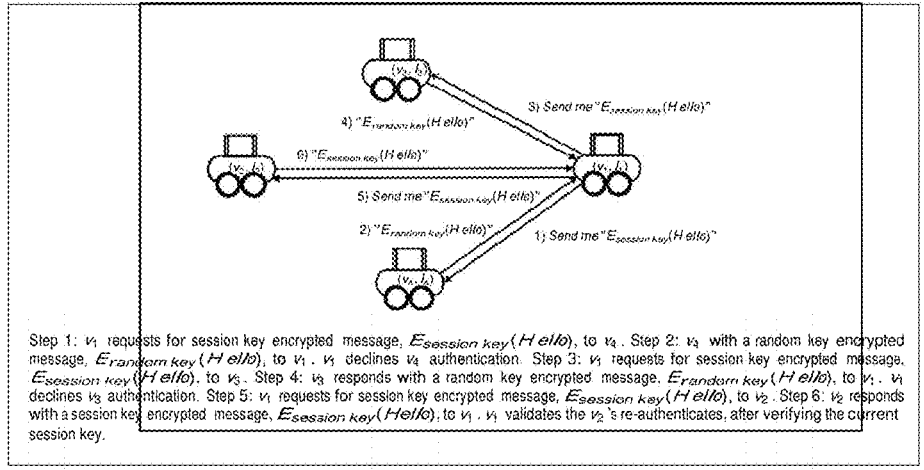

Step 1: $v_1$ requests for session key encrypted message, $E_{session\ key}(Hello)$, to $v_4$. Step 2: $v_4$ with a random key encrypted message, $E_{random\ key}(Hello)$, to $v_1$. $v_1$ declines $v_4$ authentication. Step 3: $v_1$ requests for session key encrypted message, $E_{session\ key}(Hello)$, to $v_3$. Step 4: $v_3$ responds with a random key encrypted message, $E_{random\ key}(Hello)$, to $v_1$. $v_1$ declines $v_3$ authentication. Step 5: $v_1$ requests for session key encrypted message, $E_{session\ key}(Hello)$, to $v_2$. Step 6: $v_2$ responds with a session key encrypted message, $E_{session\ key}(Hello)$, to $v_1$. $v_1$ validates the $v_2$'s re-authenticates, after verifying the current session key.

Fig. 11

1. Sender aims and points the laser beam at the selected vehicle, in order to convey the certified coupled public key and the static attributes.
2. Sender computes the ephemeral secret key $eSK_S$ and then the secret hashed exponent $H_1(eSK_S, SK_S)$.
3. Sender $S$ sends the signed certificate with message $X$, i.e., $Cert_S // X$. Where $X$ is $g^{H_1(eSK_S, SK_S)}$.
4. Receiver $R$:
   (a) Verifies the digital signature using the $CA$ public key $PK_{CA}$.
   (b) Verifies the binding between the visual static attributes $Attributes_S$ and the location using out-of-band channels, i.e., thermal image camera and laser based autocollimator, respectively.
   (c) Computes the ephemeral secret key $eSK_R$ and the exponent $H_1(eSK_R, SK_R)$. In addition, computes the secret session key $K$, i.e., $H_2(PK_S^{H_1(eSK_R, SK_R)}, X^{SK_R}, X^{H_1(eSK_R, SK_R)}, S, R)$.
   (d) Responds with the signed certificate $Cert_R // E_{PK_S}(E_{SK_R}(Y + SN_S))$. Consider $Y$ as $g^{H_1(eSK_R, SK_R)}$, also concatenated with the certificate sequence number $SN_S$ and signed with the $PK_S$ and $SK_R$.
5. Sender $S$:
   (a) Verifies the digital signature using the $CA$ public key $PK_{CA}$.
   (b) Verifies the binding between the visual static attributes $Attributes_R$ and the location using out-of-band channels, i.e., thermal image camera and laser based autocollimator, respectively.
   (c) Decrypts the value $Y$ and the concatenated certificate sequence number $SN_S$, i.e., $D_{SK_S}(D_{PK_R}(Y + SN_S))$. In addition, computes the secret session key $K$, i.e., $H_2(Y^{SK_S}, PK_R^{H_1(eSK_S, SK_S)}, Y^{H_1(eSK_S, SK_S)}, S, R)$.
6. Sender and receiver exchange the session messages encrypted with the session key $K$.

Fig. 12

CERTIFICATING VEHICLE PUBLIC KEY WITH VEHICLE ATTRIBUTES

FIELD OF THE INVENTION

The present invention relates to the field of reliable communication security. More particularly, the invention relates to a method for certificating vehicle public key with vehicle attributes.

BACKGROUND OF THE INVENTION

1 Introduction

Security is a major concern in vehicular network where on one hand the wireless, ad-hoc and mobile communication imply security threats, and on the other hand requires perfectly reliable communication, as errors have immediate hazardous implications [56]. While vehicles move in a predictable road topology, maneuvering among the vehicles is somewhat unpredictable. For example, the vehicle ordering is changed dynamically along the road.

Applications for Vehicular Networks:

Gaining on road safety and efficient traffic management are two prime goals in the use of vehicular networks. Smart vehicles may exchange information concerning road scenario with each other to help manage the traffic and to address safety concerns [24]. For example, a notification on the occurrence of an accident or a traffic jam ahead may assist the approaching vehicles to optimize their time and energy resources. In the very near future, vehicle will interact with several other vehicles on a daily trip to coordinate actions [28].

Recently, several major projects [1] such as Car2Car-Communication Consortium [2], Cartalk [3], Network on Wheels [4], Vehicle Infrastructure Integration [5], Partners for Advanced Transportation Technology [6], Secure Vehicular Communication [7], E-safety Vehicle Intrusion protected Applications [8] were conducted in order to initiate, develop and standardize the vehicle networks operation. These projects were funded by national governments and accomplished by a joint venture of automobile companies, universities and research organizations. Customized standard and hardware for vehicles: Modern vehicles are equipped with Electronic Control Units (ECU), sensors, actuators [30] and wireless transceiver that supports the DSRC (Dedicated Short Range Communication) standard [17,9] thus, enabling the creation of vehicle networks. ECU's are interlinked to trigger a collaborative decision on some safety critical event. Vehicles are equipped with local in-vehicle network and a wireless gateway to interface the in-vehicle network with the outside communication devices. In-vehicle network can be divided into controller area network (CAN), local interconnect network (LIN), and media oriented system (MOST) [34]. These embedded devices enable facilities such as automatic door locking, collision warning, automatic brake system, reporting road condition, rain and dark detection and communication with the surrounding road infrastructure.

Registration and Identity Certification:

Currently, every vehicle is periodically registered with its national or regional transportation authority, which allocates a unique identifier to the vehicle with an expiration date which is the next required inspection date. In some regions of the US and the EU, registration authorities have made substantial progress toward electronically identifying vehicles and machine readable driving license. Moreover, these registration authorities assign a private/public key pair to the inspected vehicles.

Man-in-the-Middle (MitM) Attack in Vehicle Networks:

Identifying a vehicle is crucially important in the scope of establishing secure communication with passing by vehicles. In particular, when using public key infrastructure to establish a private key among vehicle pairs in order to communicate on the road. One disadvantage of the public key infrastructure is the need to cope with MitM attacks. The following scenario demonstrates a typical MitM attack.

The scenario starts when a vehicle $v_1$ tries to securely communicate with $v_2$, requesting for the public key. Vehicle $v_3$ pretends to be $v_2$ and answers $v_1$ with $v_3$ public key instead of $v_2$. Then $v_3$ concurrently asks $v_2$ for its public key. Vehicle $v_1$ is fooled to establish a private key with $v_3$ instead of $v_2$, and $v_2$ is fooled to establish a private key with $v_3$ instead of $v_1$. Vehicle $v_3$ conveys messages from $v_1$ to $v_2$ and back decrypting and re-encrypting with the appropriate established keys. In this way $v_3$ can find the appropriate moment to change information and cause hazardous actions to $v_1$ and For example, consider three vehicles $v_1$, $v_2$ and $v_3$ with different brands and license numbers. Vehicle $v_1$ wants to establish a key with $v_2$, a Mercedes-Benz with license number $l_2$, and send a request for a public key, specifying that it would like to set a secret session key with the Mercedes-Benz that carries the license number $l_2$. At this point $v_3$ which is a Toyota with license number $l_3$ intercepts and sends its public key as if it belongs to the Mercedes-Benz that carries the license number $l_2$. Now, $v_1$ can verify that the received public key (of $v_3$ pretending to be $v_2$) has been legally produced by the CA, and may fooled to establish a secret session key with $v_3$. Thus, $v_1$ confirms the public key authenticity but cannot be sure whether it just verified a Mercedes-Benz with license number $l_2$ or a Toyota that pretends to be a Mercedes-Benz with license number $l_2$.

BRIEF DESCRIPTION OF THE DRAWINGS

In the drawings:

FIG. 1 shows a possible structure of a certificate;

FIG. 2 shows a pseudo-code description of the secret key establishment procedure;

FIG. 9 illustrates a customized certificate structure that conveys the certified coupled public key and static attributes;

FIG. 10 illustrates a generalized form of the proposed authentication protocol;

FIG. 11 shows a scheme where vS can identify vR among the group of maliciously identical vehicles;

FIG. 12 shows certified public key exchange followed by the mutual authentication through visual binding, in two explicit steps;

DETAILED DESCRIPTION OF PREFERRED EMBODIMENTS

Figure 3:
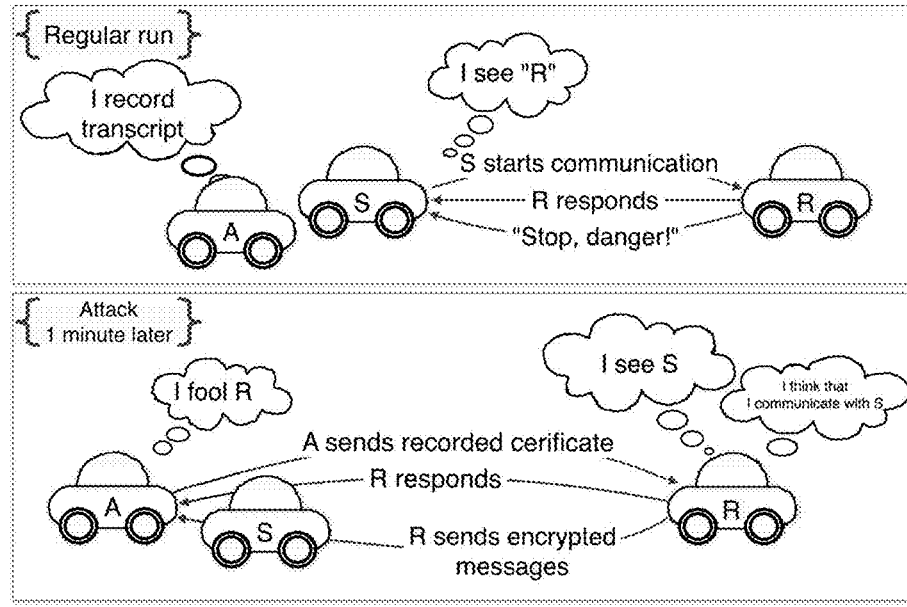
FIGS. 3 and 4 show two versions of Impersonation Repetition attacks, respectively.

To avoid such a design that is sensitive to MitM attacks we suggest to certify both the public key and the attribute together in a monolithic fashion. This is possible by having the certified linked fixed attributes together with the public key.

Public key infrastructure has a severe disadvantage when coping with MitM attacks not only in the scope of vehicle networks. Even when the certificate authority (CA) signs the public key, the public key owner should be identified by out-of-band means to cope with signed certificate thefts [47]. We propose a solution that employs vehicles fixed attribute based certification mechanism to correctly identify the neighboring vehicles. The periodic licensing routine can serve as an important ingredient of our scheme. Our method has the benefit of interacting with the CA only during preprocessing stages, rather than during the real-time secret session key establishment procedure. The certified attributes may be visually verified by a camera, microphone, wireless transceiver fingerprint identification [21], and/or other sensing devices which will feed the received data to, say, machine learning based classifier that will approve that indeed the attributes in the certificate match the sensed attributes of the vehicle. Visual identification may imply a better authentication of the transmission source in comparison with noise and/or transceiver fingerprint. Therefore, the trust level in the information communicated by a neighbor, and the type of actions taken according to the information received from the neighbor, may depend on the current set of attributes verified by out-of-band means.

Our solution relies on the CA approval that the public key was originated by the CA, and that the public key belongs to the vehicle with the coupled signed attributes. Given such certified public key and vehicle attributes, we are able to establish a secret session key with neighboring authenticated vehicle using only two communication rounds. Once the session key is established vehicles can securely exchange messages.

The paper is organized into four sections. Next, subsection highlights the related work regarding security threats, mitigating man-in-the-middle attacks, entity authentication and out-of-band channel authentication. In Section 2 a detailed description of the proposed work has been given. In Section 3 we discuss properties of our proposition in relation to security provided by other key establishment protocols. Section 4 highlights the transport layer security handshake with certified attributes. The last Section 5 concludes the discussion on the proposed scheme. Proofs are omitted from this extended abstract.

Related Work

In what follows, we describe in more details the related work, concerning vehicle networks threats, the state of art for mitigating MitM attacks. Then we describe existing entity authentication schemes, and in particular, the use of group coordination and distance maintenance.

Vehicle Networks Threats:

Autonomous wireless connection among vehicles imposes serious security threats such as eavesdropping [54], identity spoofing [19,53], sybil attack [42], wormhole attack [46], replay attack [62], message content tempering [18], impersonation [14], denial of service attack (DoS) [13] and man-in-the-middle attack [32].

Mitigating Man-in-the-Middle Attacks:

Global System for Mobile Communication (GSM) is one of the most popular standards. Unfortunately, it uses only one sided authentication between the mobile station and the coupled base station [10]. Universal Mobile Telecommunication Standard (UMTS) improves over the security loopholes in GSM. It includes a mutual authentication and integrity protection mechanism but is still vulnerable to MitM attacks [60].

MitM and DoS attack analysis for Session Initiation Protocol (SIP) is shown in [20], using a triangle communication model between SIP user agent and server. This work presents an analysis on the attack possibility, but does not offer any solution to the problem in hand. The interconnection between 3G and wireless LAN is vulnerable to MitM attacks by influencing the gateway nodes [63]. According to [33] mobile host and base station shares a secret cryptographic functions and mutually raises a challenge-response string, prior to employing the original Diffie-Hellman key exchange scheme [22]. Thus, mobile host replies with a cryptographic response and Subscriber Station Identifier (SSI) to base station, but it does not verify any of the unchangeable attributes of the intended subscriber. This way a base station, capable of verifying a unique SSI connection, may not confirm the authentic owner of the SSI connection.

Entity authentication: There has been a great research activity in the scope of cryptographic solutions [48] for entity authentication. A security scheme for sensor networks, called TESLA has been proposed in [49]. TESLA is based on delayed authentication with self-authenticating key chains. TESLA yields a time consuming authentication mechanism (as the messages received on a timeline, can be authenticated, only after receiving the immediate next message over the same timeline). Although, chances are less but still a man-in-the-middle can intercept through weak hash collisions and fake delayed key. An improvement TESLA++ has been suggested in [59], as an adapted variation of delayed authentication. A combination of TESLA++ and digital signature provides Denial of Service (DoS) attack resilience and non-repudiation respectively. The drawback with this approach is that message digest and corresponding message (with self-authenticating key) is transmitted separately to the receiver. Thus, man-in-the-middle may step in, as it does not follow the fixed attribute based verification.

Raya and Haubaux [51,52] proposed that each vehicle contains a set of anonymous public/private key pairs, while these public keys have been certified by CA. The certificates are short lived and therefore needs to be confirmed with a Certificate Revocation List (CRL) before the use. The drawback with this approach is that road-side infrastructure is required to provide the most updated CRL. A man-in-the-middle attack resistant key agreement technique for peer to peer wireless networks appears in [16] where primary mutual authentication is done before the original Diffie-Hellman key exchange. This primary authentication step could be secret digest comparison, e.g., through visual or verbal contact, distance bounding or integrity codes. A man-in-the-middle can intercept because the proximity awareness, visual and verbal signals are computed by the device and verified by the user; while in our case it is already certified by CA and then user verifies it again. The secure communication scheme in [61] is enhancement over the Raya and Haubaux scheme, in that certified public key is exchanged and further used to setup a secret session key as well as group key. Here, the attacker can pretend to be some other vehicle, by replaying the certificates and there exists no other means to verify that this vehicle is not the actual owner of the certificate.

There exists a few one round protocols that ensures weak forward secrecy [36] providing Forward Secrecy only when the adversary is not active in the session. These works also proves impossibility for establishing strong forward security when using only one round. One round protocols are based on a simultaneous interaction between the sender and receiver. However, one way protocol with strong secrecy exists in [31, 23,15]. They have assumed that the ephemeral secret keys are exchanged between the peer parties while the adversary is not allowed to extract any of these ephemeral secret keys.

Our work is the first that demonstrates the utility of out of band identification using coupled public key and fixed verifiable attributes. We ensure the countermeasures against the man-in-the-middle attack in two (sequential) rounds of communication. Out-of-band channel authentication: There have been great efforts to utilize various auxiliary out-of-band channels for entity authentication. The notion of pre shared secret over a limited contact channel has been raised in [58]. A method shown in [29, 44] suggests that a common movement pattern can help mutually authenticate two individual wireless devices driven by single user. In [57] a pre-authentication phase is required before the original public key is exchanged and confirmed over the insecure wireless channel. Pre-authentication channel is a limited scope channel to share limited information, still it inherits the same vulnerability as wireless channel have. In this scheme there may be cases when a vehicle is not sure that it received data from whom it should receive. In our scheme we do it in reverse first wireless channel authentication and then verification over out-of-band channel, and that too certified by CA during preprocessing.

Another work in [45] presents a visual out-of-band channel. A device can display a two dimensional barcode that encodes commitment data, hence, a camera equipped device can receive and confirm this commitment data with the public key. Unfortunately the attacker can still capture and/or fabricate the visible commitment data, as it is not certified with the public key. The approach in [25] is based on acoustic signals, using audio-visual and audio-audio channels to verify the commitment data. In the former a digest of the public key is exchanged by vocalizing the sentence and comparing with a display on the other device, while the later compares vocalized sentences on both devices. In a recent work [55], Light Emitting Diode (LED) blinks and the time gap between those blinks has been used to convey the digest on the public key. Also, a combination of audio-visual out-of-band channel has been proposed in [50], that uses beeps and LED blinks in a combination to convey the commitment data. The proposed method is less effective because the public key and the out-of-band information are not certified and therefore man-in-the-middle can learn the out-of-band information and replay it. The approach in [43] suggests the use of spatial reference authentication, which is dynamic and can be manipulated by the man-in-the-middle. Also, the visual laser authentication can be ambiguous due to the equipment and the foggy weather condition unlike our scheme that relies on static sense-able attributes coupled with the public key.

2 Out-of-Band Sense-Able Certified Attributes for Mitigating Man-in-the Middle Attacks We suggest mitigating man-in-the-middle attacks by coupling out-of-(the wireless)-band verifiable attributes. Vehicles are authenticated using digitally signed certificates and out-of-band verifiable attributes. For example, these attributes may include visual information that can be verified by input from a camera when there exists line-of-sight, including the identification of the driving license number, brand, color and texture, and even the driver faces if the owner wants to restrict the drivers that may drive the vehicle. Other attributes may be verified by other sensing devices, such as microphone for noise.

Our approach does not require any communication with the certificate authority or the road side units, while actually authenticating vehicles on the move. The only interaction with the CA is during a preprocessing stage, which is mandatory to possess a certificate. The certificate holds a public-key and unchangeable (or rarely changeable) attributes of the vehicle signed by the CA. These out-of-band sense-able vehicular attributes should be sensed by other vehicles and checked in real-time. Note that the procedure to check these vehicular attributes may be given as part of the certified information. Our scheme is a viable solution to combat the man-in-the-middle attacks, as it utilizes a separate sense-able out-of-band channel to authenticate the unchanged vehicular attributes. The certificate can be updated and restored on each periodical inspection or in the rare case of attribute change. Thus, saving time and communication overhead in the authentication process, as well as avoiding a CA communication bottleneck, obtaining a scheme suitable for emergency and safety critical applications. Detailed description of the solution appears in the next section.

In the proposed scheme vehicles carry digitally signed certificate Cert from CA, see FIG. 1 for a possible structure of such a certificate. The pseudo-code description of the secret key establishment procedure appears in FIG. 2. In the procedure we use PK to denote the public key, SK to denote the private key, $key_r$ is the obtained shared secret session key, H is the shared hashing algorithm and $\|$ denotes the appended string value. Note that the + sign denotes a predetermined symmetric composition and accordingly continuous zero bits are padded between the two cipher components. Hence, the cipher components linked with + are verified against the cipher component value as well as the symmetric zero composition between these components.

We assume that the CA established a certificate in the form of $Attribute_S + Publickey_S \| E_{SKCA}(Attribute_S + Publickey_S)$) for each party. These certificates are used to establish a (randomly chosen) shared key, $key_r$. The shared key $key_r$ can then be used to communicate encrypted information from the sender to the receiver and back. One way to do this is to use $key_r$ as a seed for producing the same pseudo-random sequence by both the sender and the receiver. Then XOR-ing the actual sensitive information to be communicated with the bits of the obtained pseudo-random sequence. Next, we describe in detail the involved entities, and their part in the procedure for establishing a session key.

Certificate Authority: The list of CAs with their public keys $PK_{CA}$ may be supplied as an integral part of the transceiver system of the vehicle, similar to the way browsers are equipped with a list of CAs public keys. Only registered vehicles are allowed to conununicate on the road. Digital signatures $E_{SKCA}(H(Attribute_{sender} + Public key_{sender}))$ represent the hash of public key and attributes encrypted with the CA secret key $SK_{CA}$. The digital certificate works as an approval over the public key and the out-of-band verifiable attributes of the vehicle. The CA can update or renew a certificate, upon a need, or when the current certificate expires.

Vehicular Attributes: Vehicles incorporate various sensors to capture useful primitive from the neighborhood. Each vehicle is bound to a set of primitives yielding a unique identity to that vehicle. Vehicles identity encloses a tuple comprised of attributes such as license number, public key, distinct visual attributes and other out-of-band sense-able attributes, extending the basic set of attributes required according to ISO 3779 and 3780 standard [11]. These out-of-band sense-able attributes are captured through customized device connections such as camera, microphone, cellular communication and satellite (GPS system). In addition, we suggest to identify the wireless communication itself, rather than the contents sent by the wireless communication, this is done by the certified transceiver fingerprints. Thus, the transceiver must be removed from the original vehicle and possibly be reinstalled in attackers vehicle to launch the attack. Verifying each of the attributes by out-of-band channel implies certain trust level in the identity of the communicating party, which in turn implies the possible actions taken based on the received information from the partially or fully authenticated communicating party. Thus, a vehicle can perceive the surroundings from driver's perspective using vision with a sense of texture, acoustic signals, and the digital certificate. A combination of these primitives is different for every vehicle, the unique license number observed by the camera, the outlook of the vehicle including specific equipment, or specific visual marks such as specific color repair marks, unique license number, outlook of the vehicle, manufacturer's logo, engine acoustics classification signals. During the communication vehicles continuously exchange the geographic coordinates that can be certified as being received from the certified GPS device, according to the device unchangeable identification number. Here the attacker has to physically remove the GPS device from the original vehicle in order to act on its behalf. Therefore, a certified GPS device number attached with the current GPS location, velocity and direction justifies high certainty, together with other cross-verified attributes, such as the visual attributes, on the vehicle identity.

We next outline the arguments for the safety assurance implied by our scheme. The proposed approach is resistant to man-in-the-middle attack. The CA public key is conveyed to vehicles in secure settings. CA receives the request for the certificate deliverance and only the intended recipient will get the certificate Cert from CA. An attempt to manipulate the certificate $Cert_S$ contents, in order to replace the attributes to fit the attacker vehicle attributes or the public key, will be detected as the digital signature $E_{PKCA}(H(Attribute_S+Public\ key_S))$ yields an impossibility to modify a certificate or to produce a totally new one. Receiver R decrypts the digital signature using the CA pubic key $PK_{CA}$ and confirms the validity. Thus, any verifiable certificate has been originated by the CA and therefore the attributes coupled with a certain public key uniquely characterize the vehicle.

After the mutual authentication is done through a signed public key verification, coupled with the fixed sense-able attributes, a session key is to be established. A random string $key_r$ is generated at the receiver R and is sent along with the certificate $Cert_R$, in response to sender S request for certificate $Cert_R$. As the key, can be replaced by a MitM, S needs to authenticate the origin of $key_r$. Moreover, an attacker can manipulate the random string in between thus, it requires to ensure the integrity. First, R encrypts the $key_r$ and Sequence $Number_S$ using S public key $Public\ key_S$, i.e. $E_{Public\ key_S}(key_r+Sequence\ Number_S)$ so that only S can decrypt the random string using corresponding secret key $SK_S$. Thus, the confidentiality is ensured as only intended receiver can decrypt the $key_r$ as $D_{SKS}[E_{Public\ key\ S}(key_r+Sequence\ Number_S)]$. In order to verify this key, with the digital signature, a hashing algorithm H is applied that produces a hashed key string $H(key_r+Sequence\ Number_S)$. Second, a digital signature, i.e.

$E_{Public\ key_S}(E_{SKR}(H(key_r+SequenceNumber_S)))$ is attached with the encrypted random string $E_{public\ key_S}(key_r+SequenceNumber_S)$. Thus, integrity is maintained as only R can generate these signature. Similarly, only S can retrieve the $H(key_r+Sequence\ Number_S)$ from the signature using secret key $SK_S$ and Public $key_R$ as $D_{SKS}(D_{Public\ keyR}(H(key_r+Sequence\ Number_S)))$. Next, the $H(key_r+Sequence\ Number_S)$ from digital signature is compared with the hashed key string generated locally. If both hashed key strings are same then $key_r$ is accepted as a session key. Note that the signed and encrypted $key_r$ and Sequence Number can not be used as part of a replay attack, however, such usage will be detected by the sender and the receiver as the actual value of $key_r$ is not revealed to the attacker. The use of synchronized date-time and signed association of the date-time can avoid even such unsuccessful attack attempts.

3 AKE Protocols and Out-of-Band Sensible Attributes Authentication

Many Authenticated Key Exchange protocols (AKE), that allow two parties to authenticate each other and to establish a secret key via a public communication channel, have been proposed over the past years addressing various adversary models and possible attacks [37,40,35,38,41,39]. Informally, as it is stated in [35], AKE protocols should guarantee the following requirements: Authentication—each party identifies its peer within the session; Consistency—if two honest parties A, B, establish a common session key K, then A believes it communicates with B, and B believes it communicates with A; Secrecy—if a session is established between two honest peers then no adversary should learn any information about the resultant session key.

Usually the above requirements are more formally described by detailed scenarios that involves resistance to the following attacks: Basic KE security is defined via so called KE experiment in which an adversary that controls a communication channel should not be able to distinguish the session key established between parties from a random value. Forward Secrecy (FS) property guarantees that a session key derived from a set of long-term public and private keys will not be compromised if one of the (long-term) private keys is compromised in the future. So it says that an adversary who corrupted one of the parties (learns the long-term secret key), should not be able to learn session keys of past sessions executed by that party. Known Session Key Attack resilience provides that an adversary who learns a session key should be unable to learn other session keys.

Additionally, authentication in AKE protocols implies resistance to various misidentification threats: Unknown Key-Share Attacks resilience prevents an adversary to cause the situation whereby a party (say A), after protocol completion, believes she shares a key with B, and although this is in fact the case, B mistakenly believes the key is shared with a party E (other then A). Key Compromise Impersonation (KCI) resilience provides that an adversary who learns a long-term secret key of some party (say A) should be unable to share a session key with A by impersonation as other party to A, although obviously it can impersonate A to any other party. Extended Key Compromise Impersonation (E-KCI) resilience. In regular AKE protocols parties use additional random parameters (called ephemeral keys), such as ephemeral Diffie-Hellman keys, coined e.g. for the purpose of session initialization. An adversary who learns both: a long-term secret key, and an ephemeral key of some party (say A), should be unable to share a session key with A by impersonation as other party to A. Ephemeral Key Compromise Impersonation (ECI) resilience. An adversary who learns only an ephemeral key of some party (say A) should be unable to share a session key with A by impersonation as other party to A.

In this paper we focus on specific AKE scenarios for securing the communication of vehicles via out-of-band sensible attributes. We assume that:
1. a sender and a recipient use specialized devices for recognizing out-of-band sensible attributes.
2. these devices can precisely pick the peer vehicle, and can accompany a regular (say radio communication) channel.
3. the out-of-band sensible attributes can identify a vehicle uniquely.

If the above mentioned assumptions does not hold, the protocol from FIG. 2 can be a subject of impersonation repetition attacks, and does not fulfill FS feature, as it is outlined below. Impersonation Repetition attack—version 1: any adversary A that is within the radio range of a sender S (with $Attribute_S$) and a recipient R (with $Attribute_R$), and that once recorded a valid transcript (including certificate of S) between them, can initialize future communication from S. Although A cannot decipher responses from R, the attack could be used to make R thinking that S wants to communicate. Moreover R can use such an initialized session to send some valid but unwanted messages to S. (see FIG. 3). Impersonation Repetition Attack—version 2: This attack is more powerful. An adversary A, that once recorded a valid transcript between a sender S (with $Attribute_S$) and a recipient R (with $Attribute_R$), can simulate future answers (steps 2a, 2b) for the same recipient R (or for any other recipients R'—that has similar attributes $Attribute_R$) challenged by S. Adversary A simply sends back messages previously recorded in steps 2a, 2b (see FIG. 4). Thus, after S finishes protocol in accepting state, it thinks it partnered with the intended R, and starts to decrypt subsequent messages encrypted with the established key. Although, in this repetition attack, A does not learn the session key, after acquiring the first message from S the adversary A can send back previously recorded answers from R to S, finishing protocol. Subsequently A can continue with sending previously recorded ciphertexts encrypted with the previous session key. Such ciphertexts would be accepted as valid, and decrypted by S. If the protocol was run only for authentication purposes (peers do not want to communicate further, which we do not consider here), the attack itself is a serious threat, e.g. in the case where S is a police car that monitors the speed of other cars and wants to identify the recipient. Improvements Against Impersonation Attacks. In the case of the proposed protocol we can simply protect against impersonation attack version 1 in the following way: a sender S encrypts an acknowledgment of the second message it gets from R with the session key and sends at the beginning of the transmission through the encrypted channel. For the protection against the impersonation attack version 2 a sender S sends (in the first step) to R a concatenation $Cert_S|Nonce_S$, where $Nonce_S$ is a unique random challenge coined for that session by S. Then the cryptograms answered by R in the second step should include the same $Nonce_S$, which subsequently should be verified by S.

Forward Secrecy (FS): This is the protection of past session keys in spite of the compromise of long-term secrets. if the attacker somehow learns the long-term secret information held by a party (the party is controlled by the attacker, and referred to as corrupted), it is required that session keys, produced (and erased from memory) before the party corruption happened, will remain secure (i.e. no information on these keys should be learned by the attacker). Obviously our protocol does not fulfill FS. If the attacker records transcripts and then corrupts the party S (got its private keys), then the previous session keys $key_r$ are exposed and transcripts can be deciphered. Improvements for FS. We can improve our protocol for FS by setting: $Nounce_S=g^\alpha$, responded $key_r=g^\beta$, for some random ephemeral keys $\alpha$, and $\beta$. Then the session key would be derived from the value $g^{\alpha\beta}$, computed independently on both sides.

Figure 5:
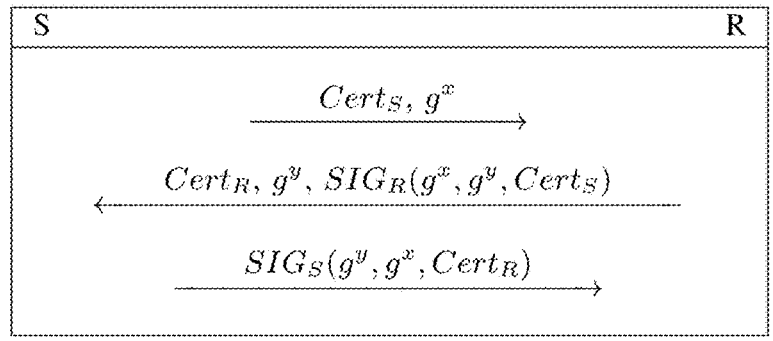
FIG. 5 presents the protocol, where $Cert_S$, and $Cert_R$ are certificates.
Figure 6:
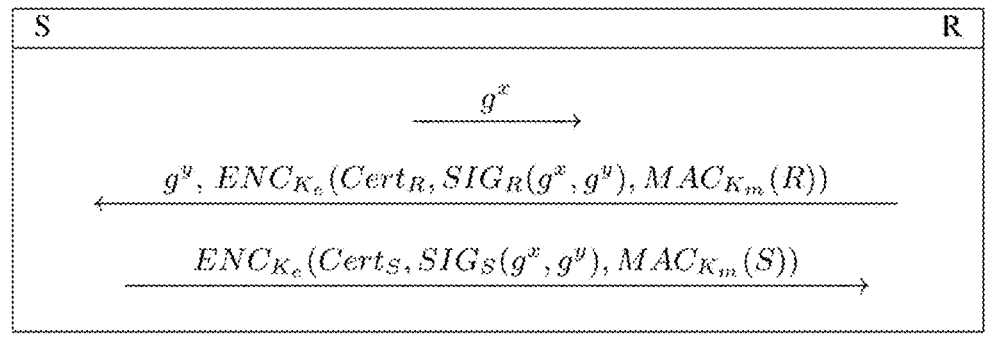
FIG. 6 shows a procedure using a SIGMA protocol.

Obviously one can also utilize some three rounds protocols, instead of our two rounds protocol, protocols previously discussed in literature, that do not require a predefined knowledge of peers identity. The idea of out-of-band senseable attributes can be incorporated into them without undermining their security. The first straightforward choice would be ISO KE protocol, described in [12], and mentioned among other protocols in [35]. FIG. 5 presents the protocol, where $Cert_S$, and $Cert_R$ are certificates proposed in this paper. In the protocol, parties that receives certificates immediately validate them by the means of CA public key, and out-of-band visible attributes. They also validate received signatures and proceed only if the validation is correct. The established session key $K_S$, is derived from $g^{xy}$. Note that this protocol does not support identity hiding, as certificates are transferred in plaintexts. If we consider anonymity (certificates should not be transferred as plaintexts) as a requested feature, we could use SIGMA protocol from [35] (FIG. 6), where a session key $K_S$, an encryption key $K_e$ and a message authentication key $K_m$ are derived from

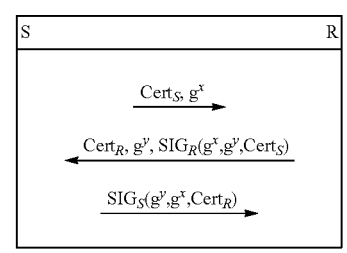

$g^{xy}$ ($K_S$, $K_e$, and $K_m$ keys must be computationally independent from each other). Here parties decrypt messages by the means of the key $K_e$, validate certificates by the means of CA public key, and out-of-band visible attributes. They also validate received signatures. Each part independently proceeds only if both the decryption and validation are correct.

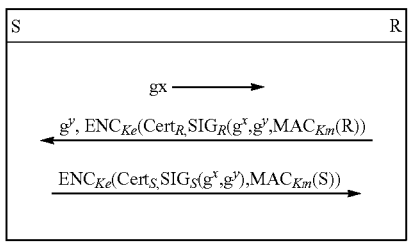

If deniability property (that assures that transcript should not be regarded as a proof of interaction) is important, then we propose to adopt one of the protocols [27,26]. However in this case we should assume that parties private keys are discrete logarithms of corresponding public keys, and computations are performed in algebraic structures where discrete logarithm problem (DLOG) is hard. Although deniable protocols from [27,26] require four passes of messages, they were designed for machine readable travel documents— which in turn can be implemented on smart-cards. Therefore we acknowledge that implementing them for vehicular communication can also be considered.

4 Transport Layer Security Handshake with Certified Attributes

The scheme presented in the previous section is based on Transport Layer Security (TLS) scheme augmented with the signed coupled public key and attributes. TLS handshake is based on a pre-defined sequence of phases such as mutual authentication, random secret exchange and session key establishment. Handshake between the sender S and receiver R starts by invoking the opposite party and sending the supported range of cryptographic standards called as Hello message. Mutual authentication is accomplished through the CA signed certificates called as Certificate Exchange message. At first, S forwards the certificate $Cert_S$ to R which then verifies the CA signature on $Cert_S$ and the out-of-band sense-able fixed attributes $Attribute_S$. Similarly, S also verifies the CA signature on $Cert_R$ and the out-of-band sense-able fixed attributes $Attribute_R$.

Once the sender and receiver have exchanged and verified the respective certificates $Cert_S$, $Cert_R$ and attributes $Attribute_S$, $Attribute_R$; a session key $key_r$ needs to be established on both sides. For that, R generates a random string key, and shares it with S to derive a common session key between them. The random string and intended receivers certificate sequence number is encrypted $E_{Public\ key_S}(key_r+Sequence\ Number_S)$ by using the public key $Public\ key_S$ and is concatenated with a digital signature $E_{Public\ key_S}(E_{SK_R}(H(key_r+Sequence\ Number_S)))$. This way a MitM attacker can no longer fabricate the combination of session key $key_r$ and sequence number $Sequence\ Number_S$. S can now decrypt the random string $key_r$ with the certificate sequence number $Sequence\ Number_S$ using $SK_S$ and also the digital signature by using $SK_S$ and $Public\ key_R$ respectively.

This completes the discussion on mutual authentication and session key establishment. Now, S and R switches to the symmetric encryption. The recently established session key $key_r$ is used on both sides to encrypt and decrypt the message.

5 Conclusion

The proposed work provides man-in-the-middle attack resistance and mutual authentication using certified public key and out-of-band sense-able attributes. As the CA pre-processes every vehicles public key and unchangeable attributes, there is no way that man-in-the-middle can fake the public key or the unchangeable attributes. Also, the out-of-band attributes are sense-able and can be confirmed, while moving on the road. There is no need to communicate with the CA during the real-time session key establishment of a secret key based on the mutual authentication of vehicles. The proposed approach is simple, efficient and ready to be employed in current and future vehicular networks.

Acknowledgment We thank Niv Gilboa, C. Pandu Rangan and Sree Vivek for valuable comments.

REFERENCES

1. VANET Projects and Consortia available at URL: http://www.vanet.info/?q=node/13.
2. CAR 2 CAR Communication Consortium (C2C-CC) available at URL: http://www.car-to-car.org/.
3. Cartalk2000 available at URL: http://www.cartalk2000.net/.
4. Network on Wheels (NoW) available at URL: http://www.network-on-wheels.de/.
5. Vehicle Infrastructure Integration (VII) available at URL: http://www.vehicle-infrastructure.org/.
6. Partners for Advanced Transportation TecHnology (PATH) available at URL: http://www.path.berkeley.edu/.
7. Secure Vehicle Communication (SeVeCom) available at URL: http://www.sevecom.org/.
8. E-safety Vehicle Intrusion protected Applications (EVITA) available at URL:http://www.evita-project.org/.
9. Dedicated Short Range Communications (DSRC) Concept of Operations and ISO Layer Implementation Summary available at URL: http://grouper.ieee.org/groups/scc32/Attachments.html.
10. Global System for Mobile Communications (GSM) available at URL: http://www.etsi.org/index.php/technologies-clusters/technologies/mobile/gsm.
11. International Organization for Standardization (ISO) available at URL: http://www.iso.org/.
12. Iso/iec is 9798-3, entity authentication mechanisms, part 3: Entity authentication using asymmetric techniques, 1993.
13. O. Abumansoor and A. Boukerche. Preventing a dos threat in vehicular ad-hoc networks using adaptive group beaconing. In *Proceedings of the 8h ACM symposium on QoS and security for wireless and mobile networks*, pages 63-70, New York, N.Y., USA, 2012.
14. M. Barbeau, J. Hall, and E. Kranakis. Detecting impersonation attacks in future wireless and mobile networks. In *MADNES*, pages 80-95, 2005.
15. C. Boyd and J. Nieto. On forward secrecy in one-round key exchange. In L. Chen, editor, *Cryptography and Coding*, volume 7089 of *Lecture Notes in Computer Science*, pages 451-468. Springer Berlin Heidelberg, 2011.
16. M. Cagalj, S. Capkun, and J.-P. Hubaux. Key agreement in peer-to-peer wireless networks. *Proceedings of the IEEE*, pages 467-478, 2006.
17. C. Campolo and A. Molinaro. Multichannel communications in vehicular ad-hoc networks: A survey. *Communications Magazine, IEEE*, 2013.
18. S. Capkun, M. Cagalj, R. K. Rengaswamy, I. Tsigkogiannis, J.-P. Hubaux, and M. B. Srivastava. Integrity codes: Message integrity protection and authentication over insecure channels. *IEEE Trans. Dependable Sec. Comput.*, pages 208-223, 2008.

19. G. Chandrasekaran, J. Francisco, V. Ganapathy, M. Gruteser, and W. Trappe. Detecting identity spoofs in ieee 802.11e wireless networks. In *Global Telecommunications Conference, 2009. GLOBECOM 2009. IEEE*, pages 1-6, 2009.
20. Z. Chen, S. Guo, K. Zheng, and H. Li. Research on man-in-the-middle denial of service attack in sip voip. In *Proceedings of the 2009 International Conference on Networks Security, Wireless Communications and Trusted Computing—Volume 02*, pages 263-266, Washington, D.C., USA, 2009,
21. L. C. C. Desmond, C. C. Yuan, T. C. Pheng, and R. S. Lee. Identifying unique devices through wireless fingerprinting. In *Proceedings of the first ACM conference on Wireless network security*, pages 46-55, New York, N.Y., USA, 2008.
22. W. Diffie and M. Hellman. New directions in cryptography. *IEEE Trans. Inf. Theor.*, pages 644-654, 2006.
23. R. Gennaro, H. Krawczyk, and T. Rabin. Okamototanaka revisited: Fully authenticated diffie-hellman with minimal overhead. In *Applied Cryptography and Network Security*, Lecture Notes in Computer Science. Springer Berlin Heidelberg, 2010.
24. M, Gerla and L. Kleinrock. Vehicular networks and the future of the mobile internet. *Computer Networks*, pages 457-469, 2011.
25. M. Goodrich, M. Sirivianos, J. Solis, G. Tsudik, and E. Uzun. Loud and clear: Human-verifiable authentication based on audio. In *Distributed Computing Systems, 2006. ICDCS 2006, 26th IEEE International Conference on*, page 10, 2006.
26. L. Hanzlik, K. Kluczniak, L. Krzywiecki, and M. Kutylowski. Mutual chip authentication. Proceedings, 3rd IEEE International Symposium on Anonymity and Communication Systems 2013, 2013.
27. L. Hanzlik, K. Kluczniak, L. Krzywiecki, and M. Kutylowski. Mutual restricted identification. Proceedings, Euro PKI 2013, 2013.
28. J. Harri, F. Filali, and C. Bonnet. Mobility models for vehicular ad-hoc networks: A survey and taxonomy. *Communications Surveys Tutorials, IEEE*, pages 19-41, 2009.
29. L. Holmquist, F. Mattern, B. Schiele, P. Alahuhta, M. Beigl5, and H.-W. Gellersen. Smart-its friends: A technique for users to easily establish connections between smart artefacts. In *Ubicomp 2001: Ubiquitous Computing*, pages 116-122. 2001.
30. E. Hossain, G. Chow, V. C. M. Leung, R. D. McLeod, J. Misic, V. W. S. Wong, and O. Yang. Vehicular telematics over heterogeneous wireless networks: A survey. *Comput. Commun.*, pages 775-793, 2010.
31. I. R. Jeong, J. Katz, and D. H. Lee. One-round protocols for two-party authenticated key exchange. In *ACNS*, 2004.
32. D. Kgler. man in the middle attacks on bluetooth. In *Financial Cryptography*, pages 149-161. 2003.
33. B. Komu, M. Mzyece, and K. Djouani. Spin-based verification of authentication protocols in wimax networks. In *Vehicular Technology Conference (VTC Fall)*, 2012 IEEE, pages 1-5, 2012.
34. K. Koscher, A. Czeskis, F. Roesner, S. Patel, T. Kohno, S. Checkoway, D. McCoy, B. Kantor, D. Anderson, H. Shacham, and S. Savage. Experimental security analysis of a modern automobile. In *Security and Privacy (SP)*, 2010 IEEE Symposium on, pages 447-462, 2010.
35. H. Krawczyk, Sigma: The 'sign-and-mac' approach to authenticated Diffie-Hellman and its use in the ike-protocols. In D. Boneh, editor, *CRYPTO*, volume 2729 of *LNCS*, pages 400-425. Springer, 2003.
36. H. Krawczyk. Hmqv: A high-performance secure diffiehellman protocol. In *Advances in Cryptology CRYPTO 2005*. Springer Berlin Heidelberg, 2005.
37. H. Krawczyk. HMQV: A high-performance secure Diffie-Hellman protocol. Cryptology ePrint Archive, Report 2005/176, 2005.
38. B. A. LaMacchia, K. Lauter, and A. Mityagin. Stronger security of authenticated key exchange. In W. Susilo, J. K. Liu, and Y. Mu, editors, *ProvSec*, volume 4784 of *LNCS*, pages 1-16. Springer, 2007.
39. K. Lauter and A. Mityagin. Security analysis of kea authenticated key exchange protocol. In M. Yung, Y. Dodis, A. Kiayias, and T. Malkin, editors, *Public Key Cryptography*, volume 3958 of *LNCS*, pages 378-394. Springer, 2006.
40. L. Law, A. Menezes, M. Qu, J. Solinas, and S. Vanstone. An efficient protocol for authenticated key agreement. *Designs, Codes and Cryptography*, 28(2):119-134, 2003.
41. J. Lee and J. H. Park. Authenticated key exchange secure under the computational Diffie-Hellman assumption. Cryptology ePrint Archive, Report 2008/344, 2008.
42. D. Martins and H. Guyennet. Wireless sensor network attacks and security mechanisms: A short survey. In *Network-Based Information Systems (NBiS), 2010 13th International Conference on*, pages 313-320, 2010.
43. R. Mayrhofer and H. Gellersen. Spontaneous mobile device authentication based on sensor data. *Information Security Technical Report*.
44. R. Mayrhofer and H. Gellersen. Shake well before use: Authentication based on accelerometer data. In *Pervasive Computing*, pages 144-161. 2007.
45. J. McCune, A. Perrig, and M. Reiter. Seeing-is-believing: Using camera phones for human-verifiable authentication. In *Security and Privacy, 2005 IEEE Symposium on*, pages 110-124, 2005.
46. P. Nagrath and B. Gupta. Wormhole attacks in wireless ad-hoc networks and their counter measurements: A survey. In *Electronics Computer Technology (ICECT), 2011 3rd International Conference on*, pages 245-250, 2011.
47. R. Oppliger. Certification authorities under attack: A plea for certificate legitimation. *Internet Computing, IEEE*, page 1, 2013.
48. P. Papadimitratos, L. Buttyan, T. Holczer, E. Schoch, J. Freudiger, M. Raya, Z. Ma, F. Kargl, A. Kung, and J.-P. Hubaux. Secure vehicular communication systems: Design and architecture. *Communications Magazine, IEEE*, pages 100-109, 2008.
49. A. Perrig, R. Canetti, J. D. Tygar, and D. Song. The tesla broadcast authentication protocol, 2002.
50. R. Prasad and N. Saxena. Efficient device pairing using human-comparable synchronized audiovisual patterns. In *Applied Cryptography and Network Security*, pages 328-345. 2008.
51. M. Raya and J.-P. Hubaux. The security of vanets. In *Proceedings of the 2nd ACM international workshop on Vehicular ad hoc networks*, pages 93-94, New York, N.Y., USA, 2005.
52. M. Raya and J.-P. Hubaux. Securing vehicular ad-hoc networks. *Journal of Computer Security*, pages 39-68, 2007.
53. X. Ren and X.-W. Wu. A novel dynamic user authentication scheme. In *Communications and Information Technologies (ISCIT), 2012 International Symposium on*, pages 713-717, 2012.

54. R. L. Rivest and A. Shamir. How to expose an eavesdropper. *Commun. ACM*, pages 393-394, 1984.
55. N. Saxena, J.-E. Ekberg, K. Kostiainen, and N. Asokan. Secure device pairing based on a visual channel. In *Security and Privacy, 2006 IEEE Symposium on*, page 6, 2006.
56. K. A. Scarfone, D. Dicoi, M. Sexton, and C. Tibbs. Sp 800-48 rev. 1. guide to securing legacy ieee 802.11 wireless networks. Technical report, Gaithersburg, Md., United States, 2008.
57. D. B. Smetters, D. Balfanz, D. K. Smetters, P. Stewart, and H. C. Wong. Talking to strangers: Authentication in ad-hoc wireless networks. 2002.
58. F. Stajano and R. Anderson. The resurrecting duckling: Security issues for ubiquitous computing. *Computer*, pages 22-26, 2002.
59. A. Studer, F. Bai, B. Bellur, and A. Perrig. Flexible, extensible, and efficient vanet authentication. *Communications and Networks, Journal of*, pages 574-588, 2009.
60. J.-K. Tsay and S. Mjlsnes. A vulnerability in the umts and lte authentication and key agreement protocols. In *Computer Network Security*, pages 65-76. 2012.
61. N.-W. Wang, Y.-M. Huang, and W.-M. Chen. A novel secure communication scheme in vehicular ad-hoc networks. *Comput. Commun.*, pages 2827-2837, 2008.
62. Y. Xiao, S. Sethi, H.-H. Chen, and B. Sun. Security services and enhancements in the ieee 802.15.4 wireless sensor networks. In *Global Telecommunications Conference, 2005. GLOBECOM '05. IEEE*, page 5, 2005.
63. L. Zhang, W. Jia, S. Wen, and D. Yao. A man-in-the-middle attack on 3g-wlan interworking. In *Proceedings of the 2010 International Conference on Communications and Mobile Computing—Volume 01*, pages 121-125, Washington, D.C., USA, 2010.

Dynamic Attribute Based Vehicle Authentication

In recent future, vehicles will establish a spontaneous connection over a wireless radio channel, coordinating actions and information. Security infrastructure is most important in such a hazardous scope of vehicles communication for coordinating actions and avoiding accidents on the roads. One of the first security issues that needs to be established is authentication. Vehicle authentication with visual binding prior to establishing a wireless radio channel of communication is useful only when the vehicles possess unique visual attributes. These vehicle static attributes (e.g., licence number, brand and color) are certificated together with the vehicle public key. Therefore, we consider the case of multiple malicious vehicles with identical visual static attributes. Apparently, dynamic attributes (e.g., location and direction) can uniquely define a vehicle and can be utilized to resolve the true identity of vehicles. However, unlike static attributes, dynamic attributes cannot be signed by a trusted authority beforehand. We propose an approach to verify the coupling between non-certified dynamic attributes and certified static attributes on an auxiliary communication channel, for example, a modulated laser beam. Furthermore, we illustrate that the proposed approach can be used to facilitate the usage of existing authentication protocols such as NAXOS, in the new scope of ad-hoc vehicle networks. We use extended BAN Logic to verify security claims of the protocol against the passive and active interception.

Communication security [12] in the scope of vehicle networks [30, 10, 11] introduces new sensitive challenges. A voluntary association among vehicles require a robust authentication mechanism. For example, an instant warning message from a vehicle in front requires an instant authentication before the receiving vehicle reacts according to that warning message. It might worsen into a life threatening situation if the adversary is able to fake these warning messages.

The goal of this paper is to couple dynamic attribute (e.g., location and direction) of any vehicle along with the certified coupled list of static attributes and the public key of a vehicle. Vehicles must verify this coupling between the static and dynamic attributes, before the communication begins. We suggest to use technology assistance, such as laser technology to verify the dynamic attributes in a way that can be verified accurately. Since dynamic attributes cannot be certified beforehand, we propose to utilize a directional laser beam to bind the dynamic attributes with the certified coupled static attributes and the public key. We illustrate a scenario with multiple maliciously identical vehicles, whereas a communicating vehicle is not able to distinguish the authentic vehicle through the certified static attributes only. Every vehicle needs to generate and dispatch the messages from its own laser interface. Therefore, the sender is accountable for any fake messages sent and received by its own interface. Moreover, the corresponding receiver can also claim at the sender and then the sender is held responsible and can be penalized for sending fake messages.

According to our previous work [9], vehicle public key is certified by a Certificate Authority (CA) along with the vehicle static attributes. A certificate recipient must first verify the digital signature over the certificate contents. Second, the coupling between the certified public key and the static attributes must also be verified, in order to authenticate the certificate sender. However, it remains to be shown that static attribute verification might not be enough to avoid an impersonation attack for multiple maliciously identical vehicles.

Problem statement. We consider a scenario in which vehicles can establish a secure communication over wireless radio channel. However, it is crucial for these vehicles to identify and locate the physical presence of each other, specifically, in a group of multiple maliciously identical vehicles. The certified coupled static attribute verification might not be enough for this multiple identical vehicle scenario. Therefore, non-certified dynamic attributes must be coupled with the certified static attributes for any vehicle. First, there must be a binding between the certified static attributes and the non-certified dynamic attributes of the vehicle. Second, there must be a binding between two communication channels, i.e., a directed laser beam to convey the certified attributes and a secure wireless radio channel to convey the session messages.

Previous work. In this section, we illustrate the related work, concerning spontaneous wireless vehicle network threats [14, 2]. It is important to mention that vehicles utilize wireless communication standard, i.e., IEEE 802.11p based Dedicated Short Range Communication (DSRC) [1].

Raya and Haubaux [26, 27, 23] proposed a Public Key Infrastructure (PKI) based vehicle security scheme. The drawback with this approach is that an active adversary may launch an impersonation attack and replace the public key certificate, moreover, roadside infrastructure is required to provide the most updated Certificate Revocation List. Our scheme removes the active participation of roadside units as well as the regional authorities. The state-of-the-art for the wireless and out-of-band channel association can be found in [16]. Laser communication in vehicular networks has been primarily used for distance and velocity estimation [34, 25]. In [3,28], laser pointers are used for spontaneous ping among the hand held devices. The work in [24] presents a laser modulation technique to transmit the device network address. An adversary can also aim the laser beam with a fake network address and the recipient might not be able to distinguish the authentic laser beam. In [13], the authors suggest the transmission of the shared secret key through the laser modulation. It has the same drawback as with the previous approach [24] that is an adversary equipped with a high resolution camera might capture the laser beam modulation to recover the secret session key. Another work, in [21], presents a visual out-of-band channel. A device can display a two dimensional barcode that encodes the commitment data, hence, a camera equipped device can receive and confirm this commitment data with the available publickey. Unfortunately the attacker can still capture and/or fabricate the visible commitment data, as it is not coupled with the public key. In [20], the authors presented a scheme with commitment verification on a laser channel and capturing the. However, it assumes using Diffie-Hellman [8] key exchange on a wireless radio channel before switching on a laser channel. The drawback with this approach is that it assumes a secure initial key exchange phase on a wireless radio channel. The survey in [22] presents a classification of one-way, two-way and group authentication protocols based on the commitment before knowledge principle. The authors in [7] present an experimental study on visual means of authentication. However, there are no instances of using the laser channel as a means of authentication in vehicular networks.

Our Contribution.
We extend the authentication mechanism within the scope of non-certified dynamic attributes of any vehicle.
Vehicles are configured with directed communication capabilities, such as laser or directed antenna, used to change and verify periodically processed and digitally signed certificates.
We emphasize that the laser out-of-band communication channel is useful to convey the certified coupled static attributes. It retains the binding between the dynamic and sense-able static attributes of the target vehicle.
We use extended BAN Logic to prove the security claims regarding an active and passive interception.

The proposed approach is efficient as it completes the certified public key exchange followed by the mutual authentication through visual binding, in two explicit steps (see FIG. 12). Previously existing authentication protocols can be accompanied with the proposed approach without breaching the security claims in the existing security models (e.g. NAXOS adaptation). Furthermore, the proposed authentication protocol is beneficial for channel contention among the communicating vehicles as it completes in two rounds. Consider an overcrowded road at peak traffic hours during which each vehicle contends for the channel acquisition. The fewer rounds of certificate exchange significantly reduces the authentication overhead for the usage of shared communication band.

The system settings are described in Appendix A. It details the laser characteristics (e.g., range and intensity), applications (e.g., vehicle tracking and speed monitoring) and an autocollimator setup (e.g., a remote surface angle measurement).

Figures 7, 8:
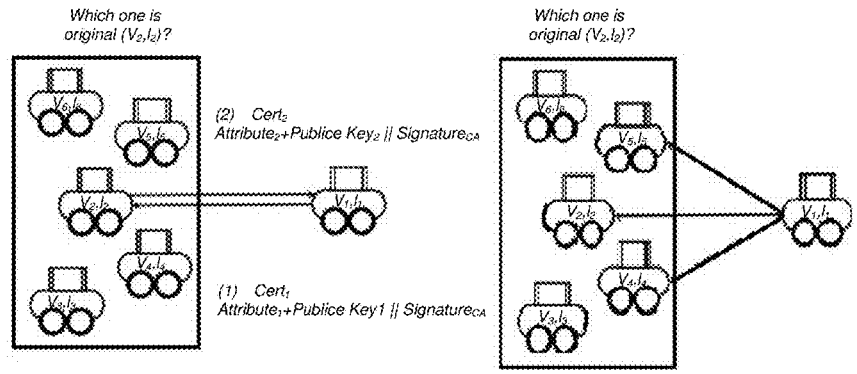
FIG. 7 shows imperfect static attribute verification.
FIG. 8, shows a session where the only the certified public key of $v_2$ is coupled with the license number $l_2$.

Attack Scenarios on Static Attribute based Scheme
The static attribute verification seems imperfect in a scenario where the adversary encompasses multiple identical vehicles that indeed impersonate a target vehicle, see FIG. 7. Vehicles are moving from left to right in both the FIGS. 7 and 8.

Maliciously Identical Vehicles.
A vehicle $v_1$ can no longer perceive the difference between the communicating partner vehicle $v_2$ and a group of maliciously identical vehicles around. Multiple identical vehicles appear immediately after a vehicle $v_1$ has established a secret session with $v_2$, see FIG. 7 on left. Although, $v_1$ and $v_2$ are in a secret session, still $v_1$ cannot identify and locate $v_2$ among the group of malicious vehicles that carry exactly similar static attributes as $v_2$ does. A vehicle receives an authentic and certified list of static attributes with the corresponding public key, in order to establish a secret session ensuring the information confidentiality. However, a vehicle in an open session with one of the similar looking vehicles, is unable to observe any physical difference. Therefore, the victim vehicle appears to be a member of these malicious vehicles or the other way around that is every identical vehicle seems to be authentic.

Attack Through Visual Misbinding.
In FIG. 8, $v_1$ establishes a session key with $v_2$ as only the certified public key of $v_2$ is coupled with (the sense-able) license number $l_2$. Apparently, $v_3$ identifies the existence of communication activity between $v_1$ and $v_2$, and subsequently, tries to mimic all out-of-band sense-able behavior of $v_2$, so that $v_1$ will not be able to distinguish which one of $v_2$ and $v_3$ is $v_2$. For example, if $v_1$ requests $v_2$ to blink using the secured wireless communication, $v_3$ will not be able to decrypt this blink request to $v_2$. However, $v_3$ can observe these responses of $v_2$ and act in the same way by blinking too. It is also important to mention that $v_2$ cannot identify its own location, in a way that makes it distinguishable from $v_3$. At this point, $v_1$ knows that it communicates with the original $v_2$, but cannot distinguish $v_2$ from $v_3$. In addition, consider that $v_2$ and $v_3$ are, respectively, on left and right side of the leading vehicle $v_1$, and $v_3$'s goal is to crash into $v_1$. If at some point $v_1$ will perform an emergency stop, then $v_1$ can notify $v_2$ on this fact and if lucky stops in the left side of the road in front of $v_2$. However, $v_1$ may believe that $v_3$ is the vehicle it communicate with, $v_1$ may stop on the right side of the road, allowing $v_3$ to crash into it.

The other way, an adversary might also launch the attack before any session establishment. In that case, multiple maliciously identical vehicles (similar as v) appear immediately before the session setup between v1 and v2 Consequently, v1 cannot distinguish between a group of maliciously identical vehicles and the original vehicle v2.

3 Dynamic and Static Attributes Based Scheme

We aim to verify dynamic attributes along with the certified static attributes and the public key. The dynamic attribute verification is accomplished through an auxiliary laser communication channel. It is important to mention that a customized certificate structure (see FIG. 9) is used that conveys the certified coupled public key and static attributes, i.e., Cert=Attribute+PK $\|\text{Sign}_{CA}$(Attribute+PK). Subsequently, third round of message exchange over the wireless radio channel is considered implicit. We next list our assumptions.

Assumptions and Mathematical Background.
Vehicles communicate in the presence of Public Key Infrastructure that provides periodic certification service.
Only CA can certify the static attributes and public key using a secret key, however, vehicles verify those certificate using the corresponding public key of CA.

Vehicles are equipped with a high precision camera, optical autocollimator, laser beam source and laser beam scanner.

Laser beam pointed at the target vehicle cannot be interrupted by the attacker without prohibiting the beam to arrive at the target vehicle.

Presented key agreement protocol and the associated authentication protocols are based on Diffie-Hellman (DH) key exchange, so we assume that corresponding computations are done within a group $G=(g)$ of prime order q, where Computational Diffie-Hellman (CDH) assumption holds.

Definition 1 (CDH assumption). Let (g) be a cyclic group generated by element g of order q. There is no efficient probabilistic algorithm $A_{CDH}$ that given $(g, g^\alpha, g^\beta)$ produces $g^{\alpha\beta}$, where $\alpha$, $\beta$ are chosen at random from G.

The CDH assumption satisfies that the computation of a discrete logarithm function DL on public values $(g, g^\alpha, g^\beta)$ is hard [19] within the cyclic group G.

Proposed Scheme.

In FIG. 10, a generalized form of the proposed authentication protocol has been shown. Each round includes the transmission of a customized certificate along with the authentication message. Accordingly, in the first round, sender vehicle selects a vehicle for communication and points the laser beam. Sender forwards its own certificate $Cert_S$ over the laser channel. At this point the customized certificate structure is accompanied with an authentication message. The authentication message from sender, i.e., $m_1$ is received and processed as per the associated security model. Receiver verifies the binding between certificate $Cert_S$ and the message $m_1$ followed by the binding between certified static attributes and the physical location of the vehicle. Now, the message $m_1$ is recovered and used to compute the session key at receiver. Similarly, receiver forwards its own certificate $Cert_R$ accompanied with the authentication message m2 over laser channel. Sender verifies the attribute binding with the public key and processes the message m2 as per the associated security model.

TABLE 1

Notations

| | | | |
|---|---|---|---|
| Receiver | R | Sender | S |
| Certificate of receiver | CertR | Certificate of sender | CertS |
| Secret key of CA | SKCA | Public key of CA | PKCA |
| Public key of R | PKR | Public key of S | PKS |
| Secret key of R | SKR | Secret key of S | SKS |
| Ephemeral secret key of R | eSKR | Ephemeral secret key of S | eSKS |
| Static attributes of R | AttributeR | Static attributes of S | AttributeS |
| Sequence number of R | SNR | Sequence number of S | SNS |
| Session key with NAXOS adaptation | K | Hash function for certificate verification | H |
| $_gH1$ (eSKR, SKR) from R | Y | $_gH1$ (eSKS, SKS) from S | X |
| Hashing function for session key K | H2 | Hashing function for X and Y | H1 |
| Decryption with the public key | DPK | Encryption with the public key | EPK |
| Decryption with the secret key | DSK | Encryption with the secret key | ESK |
| License number | l | Vehicle | v |

Our previous approach verifies only the certified static attributes of the vehicle. However, in this paper we extend our previous approach and utilize laser out-of-band communication channel for both the certified and non-certified attribute verification concurrently. Vehicle vS starts the communication on a modulated laser communication channel by aiming and pointing the laser beam on target recipient vR. It starts sending $Cert_S$ along with the ephemeral secret key g$\alpha$. After the vehicle vR receives the message on a laser beam, it verifies the certified static attributes as well as the location of the source vehicle vS. Also computes the master session key g$\alpha\beta$ locally. Now, vR responds with the CertR and ephemeral secret key g$\beta$ on the laser beam. Vehicle vS verifies the certificate and the location of laser beam source, i.e., vR. It computes the master session key g$\alpha\beta$ if the vR verification is positive. Once the master session key is computed, both vehicles switch on to wireless radio communication and use symmetric encryption over the wireless radio channel. The receiver must create a binding between the certified attributes received on the laser communication channel and the dynamic attributes recovered from the laser beam, for example, the location attributes. All notations used in this paper are given in Table 1.

In our scheme vS can identify vR among the group of maliciously identical vehicles (similar as v2), see FIG. 11. Vehicle vS might visualize multiple identical vehicles, but is already in a secret session with $v_R$. Therefore, to accomplish the re-authentication, $v_S$ starts pointing laser beam at each of these identical vehicles, because only one of these identical vehicles must respond through a correct session key encryption. It points a laser beam on a suspect vehicle and requests for a session key encrypted response. Now, if the suspect vehicle is the original vehicle $v_R$ that was already in an open secret session before the group of malicious vehicle appeared, than it must respond to $v_S$ with a correct session key encryption. Apparently, $v_S$ can locate the vehicle on which it aims and points the laser beam. Therefore, after $v_S$ receives the correct session key encrypted response from $v_R$, it stops the re-authentication for the remaining identical vehicles, and follows the trajectory of $v_R$ for the rest of the session.

4 Binding with the Existing Protocol

Our approach provides a straight binding between the vehicle location, certified static attributes and the public key. It is important to mention that our protocol can be combined with the well known existing authentication protocols, e.g., SIGMA [15], NAXOS [17], NAXOS+ [18], CMQV [33], SMQV [29] already proven to be secure in existing models such as CK [6], eCK [17] and seCK [29]. In that case message $m_1$ and $m_2$ can be computed with any one of these authentication protocols at sender and receiver, independently.

Our paper illustrates the secure binding between the optical and wireless communication channel rather the security of existing authentication protocols, i.e., SIGMA, NAXOS and NAXOS+. Therefore, the interested readers may refer to the proven security features of these authentication protocols in the extended security models. Furthermore, without the loss of generality we combine the proposed approach with the NAXOS, in order to illustrate the vehicle authentication. NAXOS assumes that sender and receiver have already exchanged the public key/certificate and requires additional two rounds for the ephemeral key exchange and session key establishment. NAXOS is resistant to the following attacks, where adversary recovers:

Key-Compromise Impersonation
  the long-term secret key of S, still cannot impersonate others to S.
  the ephemeral secret key of S, still cannot impersonate others to S.

Session Key Retrieval
the ephemeral secret key of both parties, still cannot derive the session key,
the long term secret key of one party and the ephemeral secret key of another party, still cannot derive the session key.
the long term secret key of both parties, still cannot derive the session key.

NAXOS protocol assumes that the public key has been exchanged in secure settings and requires additional two rounds to establish a secret session key among the parties. Apparently, this is not the case in our protocol, here it requires overall two explicit rounds of certificate exchange and session key establishment, without any previous identity or public key exchange. Our generalized solution based on our previous work, merges the multiple rounds into two, see FIG. 12. However, the proposed protocol benefits from the existing secure authentication protocols, in addition, provides a certified visual binding and does not interfere with the security claims of associated authentication protocol.

5 Security Discussion

In this section, we discuss the protocol security against the passive and active adversary.

Passive Adversary.

The proposed approach is secure against the passive eavesdropping over the channel. The sender and receiver establishes a laser communication channel, which is characterized by a directed point-to-point connection. Due to the physical constraints of this auxiliary authentication channel, passive listening is not possible. Passive eavesdropping on the laser channel will prohibit the data transmission between the sender and receiver, as it necessitates a line-of-sight for the beam pointing. Any kind of obstruction between the vehicles will absorb the light beam. Hence, no passive adversary can overhear the messages on a laser beam without stopping the beam to reach the intended recipient.

Active Adversary.

Figure 13:
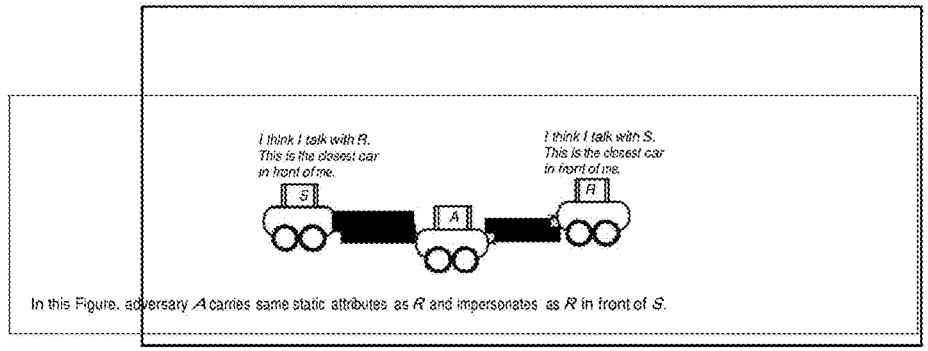
FIG. 13 shows an active impersonation in a man-in-the-middle manner.

An active impersonation, see FIG. 13, allows the adversary to intercept, remove, skip, delay, manipulate or insert fake messages, in a man-in-the-middle manner. Here, we assume that the adversary is equipped with the double laser interfaces (e.g. in front, and at the back of the car). Therefore, it can receive the messages from the intended sender's front interface towards its back interface. The active adversary forwards the same messages to the intended receiver's back interface, using its own front interface. Similarly, it forwards the response messages from the intended receiver (in front) towards the intended sender (behind). Now, the active adversary can launch an active attack in either of the following two ways:

The active adversary with exactly matching static attributes tries to intercept, remove, and skip or delay the messages between the intended sender and receiver. The active adversary does not modify the messages and its goal is to convince the sender and the receiver that they communicate with the intended car, i.e., visually identified. The active adversary has exactly similar static attributes as the intended recipient carries in order to impersonate the recipient. However, vehicles receive certified attributes, which are then visually verified before the processing of messages of the accompanying authentication protocol. Therefore, to act as a forwarder the proxy adversary should look like the sender in front of the receiver and the intended receiver in front of the sender (both at the same time), in order to qualify the attribute verification on both sides. This if not impossible still is very unlikely, and can be disregarded.

The active adversary tries to manipulate or insert fake messages. The intended sender and receiver exchange the messages with a false impression that they communicate directly to each other. Whereas, the active adversary with exactly matching static attributes sits in the middle and either modifies or injects fake message to each other, correspondingly. However, the binding between augmented certificate and laser communication channel does not weaken the security of the associated authentication protocol, such as NAXOS, which is already proven to be secure in the assumed model. Furthermore, our approach guarantees to resolve the vehicle identity in the presence of multiple identical vehicles.

6 Coalition of Adversaries

Figure 14:
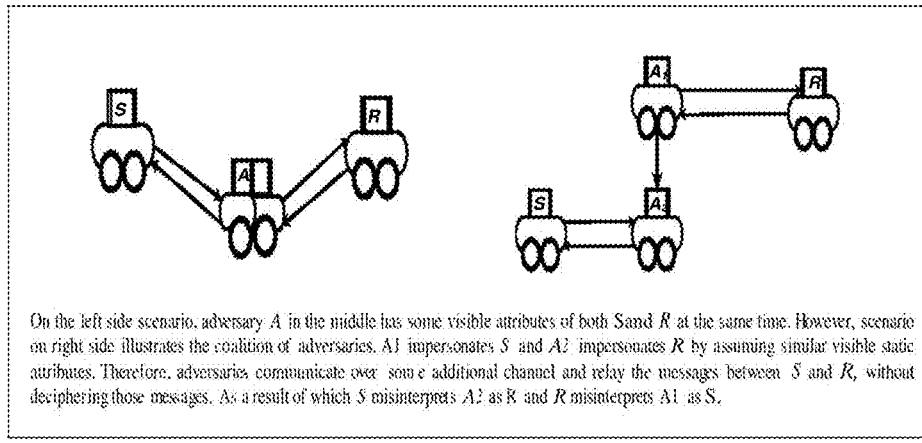
FIG. 14 shows a coalition of adversaries.
Figure 15:
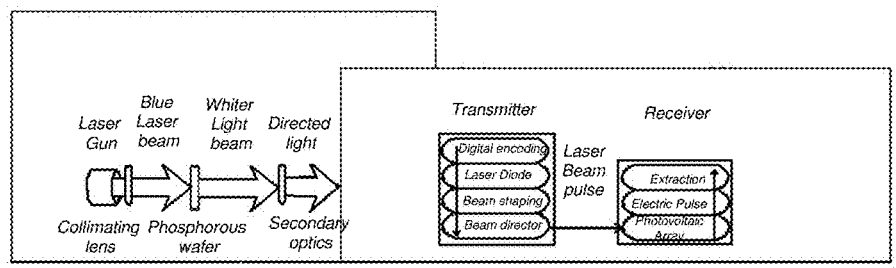
FIG. 15 shows a possible system and hardware setting.

We are not considering the coalition attack scenario in this paper, see FIG. 14. According to the coalition scenario, there exists two or more malicious vehicles between the sender and the receiver. One of these malicious vehicles impersonates sender and the other impersonates receiver by carrying exactly similar static attributes. Moreover, these malicious vehicles communicate over a separate communication channel to relay the messages between actual sender and receiver. Although malicious vehicles may not be able to decipher the messages, however, malicious vehicles can create an illusion of correct visual binding. The sender believes that it forwards message to receiver while actually forwarding it to one of the malicious vehicle impersonating the receiver and vice versa. It must be noticed that coalition scenario cannot be avoided with the proposed configurations and additional assumptions are required. In order to mitigate this coalition attack scenario and to identify the recipient vehicle (while keeping the directed nature of the channel), we plan to utilize the Wireless Fingerprinting [4] in near future.

7 Security Analysis Using BAN Logic

In this section, we illustrate the security analysis using BAN Logic [5] and the PKI (Public Key Infrastructure) based extended BAN Logic [31], First, we use the basic terminology and inference rules of BAN Logic. Next, a formal protocol interpretation, initial assumptions, protocol analysis goals and logic derivation is introduced for the proposed protocol.

Basic Notations.

The BAN Logic notations shown below are used to derive and analyze the protocol assumptions and goals.

S|=X: S believes X;
$S_c$|X: S sees X;
S|X: S said X;
S=?X: S control sX;
(X): X is fresh;
$S^{xsR}$: S and R share a secret key KsR;
XxsR: X encrypted with KsR;
p←(S, Ks): Shas public key Ks;
TI(S, $Ki^1$): S has secret key K'f/;
a(X, $K8^1$): X signed with private key K'fi$^1$;
S−1R:(X, W(X,R)): S sends X to the intended recipient R;
u(W(X, S), KR.$^1$): X signed with private key KR.$^1$ for recipient S;
{<; (X, R)}$x_s$: X signal with public key Ks from sender R.

Logical Inferences.

There exist some pre-determined logical postulates as follows. These inferences can be used together with the protocol assumptions (in next subsection) to attain the protocol analysis goals.

Message meaning rule: It concerns with the origin of encrypted messages. If S believes inCA's public key KcA and private key K(Jl, and S see the message encrypted with Kcl from the intended sender R, then S believes that the CA generated this message.

$$\frac{s \models p \leftarrow (CA, KcA), s \models TI(CA, KaI), s \triangleleft \left(\triangle\{X, CA\}x - \frac{1}{CA}\right)}{s \models CA \mid x} \quad (1)$$

S believes in public key KR and private key Ki/, and see the message encrypted with private key K]-/ for which S is the intended recipient, then S believes that R said X $$\frac{S\models p\leftarrow(R,KR),S\models=TI(R,KJi:^{-1}),S<1a(W(X,S),KJi:^{-1})}{S\models R\mid X} \quad (2)$$

S believes in a certificate from CA. If S believes that CA believes in the validity duration Δt of the certificate and and credential Φ(Statement) is still valid, then S believes that CA believed in the Statement.

$$\frac{S \models CA/\sim(Cert(\Delta t, Statement)), S \models CA \models \Delta t, S \models CA \models \phi}{(Statement)} \quad (3)$$
$$S \models CA \models Statement$$

Nonce Verification Rule:

This rule concerns with the validity of messages with respect to time. If S believes that a message X is fresh and that R said the message X, then S believes that R believes in the freshness of X.

$$\frac{S \models \blacklozenge(X), S \models R \mid\sim X}{S \models R \models X} \quad (4)$$

Jurisdiction Rule:

If S believes that R controls the message X and also believes in the message X, then S believe in the message X.

$$\frac{S \models R \Rightarrow X, S \models R \models X}{S \models X} \quad (5)$$

Decomposition Rules:

It concerns that if a message is partly fresh then whole message is fresh. Similarly, if a message can be decrypted then its components are also decrypted. For the last rule if S can see a signed message X $$\text{intended} \atop CA$$

for all then S is also one of the intended recipient for the message X.

$$\frac{S \models \#(X)}{S \models \#(X, Y)}, \frac{S < 1(X, Y)}{S < 1(X)}, \frac{S <1 \sigma\ TR(X, \text{all}), K_{CA}^{-1}}{S <1 \sigma\ TR(X, S), K_{CA}^{-1}} \quad (6)$$

Quantifiers:

Above stated rules can be augmented with the implicit or explicit quantifiers, as per the assumptions. For example, in the following postulate we assume a universal quantification, where S believes that CA controls the shared key K between S and R.

$$S \models CA \Rightarrow S \overset{K}{\leftrightarrow} R$$

While it can also be augmented explicitly such as:

$$S \models \forall K\left(CA \Rightarrow S \overset{K}{\leftrightarrow} R\right)$$

Protocol Idealization.

The two round protocol using the binding between auxiliary laser channel and certified static attributes is formalized as below. In this idealization $Cert_x$ (Δt, Statement) represents the certificate with a validity duration Δt and the credential Statement (coupled attributes and the public key), which is valid only for the duration Δt.

$$Cert_x(\Delta t, Statement) = \quad (7)$$
$$\sigma(TR((Attribute_x + K_x), {}^n K_x^{-1}, \text{all}), K_{CA}^{-1})\sigma(Cert_x, K_{CA}^{-1}) =$$
$$Attribute_x + K_x \|Sign_{CA}(Attribute^x + K^x)$$

The message $M_1$. carries $Cert_S\|m_1$ from sender to receiver.

$$M_1: S \to R: Cert_S//m_1: \{Attribute_S + K_S // Sign_{CA}(Attribute_S + K_S)\} // E_{K_S^{-1}}(g^\alpha) \quad (18)$$

Similarly, $M_2$. represents the response $Cert_R\|m_2$ from receiver to sender.

$$M_2: R \to S: Cert_R//m_2: \{Attribute_R + K_R // Sign_{CA}(Attribute_R + K_R)\} // E_{K_S^{-1}}(g^\beta + SN_S)) \quad (9)$$

Initial Assumptions.

According to the protocol every vehicle is installed with the signed certificates from CA. Therefore, the sender S and receiver R have some pre-determined belief in associated public/private key pairs. These beliefs can be summarized as below:

A1: $S/\equiv \not{\mathrel{\ell^{\!\!2}}} \kappa(CA, K_{CA})$ S believes CA associates a valid public key $K_{CA}$;

A2: $S/\equiv^n(K^{-1}{}_{CA})$ S believes CA associates a valid private key $K^-{}_{CA}$;

A3: $R/\equiv \not{\mathrel{\ell^{\!\!2}}} \kappa(CA, K_{CA})$ R believes CA associates a valid public key $K_{CA}$;

A4: $R/\equiv^n(K^{-1}{}_{CA})$ R believes CA associates a vallid private key $K^{-1}{}_{CA}$;

A5: $S/\equiv \not{\mathrel{\ell^{\!\!2}}} \kappa(S, K_S)$ S believes S associates a valid public key $K_S$;

A6: $S/\equiv^n(K^{-1}s)$ S believes S associates a valid private key $K^{-1}{}_S$;

A7: $S/\equiv Cert_S(\Delta t, Statement)$ S believes in valid certificate statement $Cert_S$;

A8: $R/\equiv \emptyset \kappa(R, K_R)$ R believes R associates a valid public key $K_R$;

A9: $R/\equiv {}^n(K^{-1}{}_R)$ R believes R associates a valid private key $K^{-1}{}_R$;

A10: $R/\equiv Cert_R(\Delta t, \text{Statement})$ R believes in valid certificate statement $Cert_R$.

A11: $S/\equiv \forall x CA \Rightarrow Cert_x$ S believes CA controls certificate for all x, A12: $R/\equiv \forall x\ CA \Rightarrow Cert_x$ R believes CA controls certificate for all x.

Analysis Goals.

We illustrate the protocol analysis goals below. It would be useful to interpret the claims regarding active and passive adversary. Goal G1 and G2 can be interpreted as the belief in public key signed by CA. Every vehicle believes in his own public/private key pair, however, to receive the correct public key from the sender over the insecure channel, receiver must acquire a confidence in the certificate credentials. Therefore, first two goals are devoted to stipulate that both the parties R and S believes in the correct public key that is $K_S$ and $K_R$, respectively.

$$G1: R/\equiv \sigma(K_S, K^{-1}{}_{CA});$$

$$G2: S/\equiv \sigma(K_R, K^{-1}{}_{CA});$$

Other two goals G3 and G4 can be deduced as R believes in $Cert_S \| m_1$ from the intended sender S and similarly, S believes that it is the intended recipient for $CertR \| m_2$.

$$G3: R/\equiv \xi(Cert_S(\Delta t, \text{Statement})//m_1,$$

$$G4: S/\equiv TR(Cert_R(\Delta t, \text{Statement})//m_2, S),$$

Logic Derivation.

We drive the first order belief for the corresponding sender and receiver in both rounds. The first round, sender S forwards a signed certificate to the receiver R. In addition, R can decrypt and verify the messages signed by the CA. The recipient R believes in the message signed by the CA, see Equation 7. By applying A3 and A4 with the Message meaning rule given in Equation 1, R believes that CA said $Cert_S$ ($\Delta t$, Statement).

$$\frac{R /\equiv \zeta K(CA, K_{CA}), R /\equiv {}^n(CA, K_{CA}^{-1}),\ R < 1\ (\zeta\ \{Cert_S(\Delta t, \text{Statement}), K_{CA}^{-1}\}S\}}{R /\equiv CA /\sim Cert_S(\Delta t, \text{Statement})} \quad (10)$$

Hence, R believes that the certificate has been originated at CA. Now, the conclusion in Equation 10 is combined with the Message meaning rule given in Equation 3 as follows.

$$\frac{R /\equiv CA/\sim(Cert_S(\Delta t, \text{Statement})),\ R /\equiv CA /\equiv \Delta t, R /\equiv CA /\equiv \phi\ (\text{Statement})}{R /\equiv CA /\equiv \text{Statement}} \quad (11)$$

As per Equation 11, R believes that CA believes in the certificate credential, i.e., Statement. It yields a second order belief that CA believes in $cert_S$. Now applying Equation 11 with the first Decomposition rule given in Equation 6.

$$\frac{CA /\equiv \blacklozenge(\text{Statement})}{CA /\equiv \blacklozenge(Cert_S(\Delta t, \text{Statement}))} \quad (12)$$

Hence, using Jurisdiction rule given in Equation 5 with the derivation in Equation 11 with the assumption in A12. The following equation yields a first order belief that R believes in $Cert_S$.

$$\frac{R /\equiv CA \Rightarrow Cert_S(\Delta t, \text{Statement}), R /\equiv CA /\equiv Cert_S(\Delta t, \text{Statement})}{R /\equiv Cert_S(\Delta t, \text{Statement})} \quad (13)$$

Therefore, R believes in the $Cert_S$ and that S associates a good public/private key pair, thereby satisfies the goal G1.

$$\frac{R /\equiv \zeta K(S, K_S), R /\equiv {}^n(S, K_S^{-1}), R <1\ \sigma(TR(m_1, R), K_S^{-1})}{R /\equiv S /\sim m_1} \quad (14)$$

According to Equation 14, R receives $m_1$ along with the certificate Statement. While, $m_1$ is encrypted with the private key $K^{-1}$. Therefore, R infers that S said $m_1$. It is important to mention that the receiver R follows the decomposition rule (in Equation 6), in order to infer the intended recipient for the secret key $K^{-1}$ encrypted message $m_1$. Now, combining Equation 14 with the first order and second order belief derived in Equations 13, 12, respectively. Hence, satisfies the goal G3.

$$M_1: R/\equiv CA/\equiv Cert_S(\Delta t, \text{Statement}) \text{hence}, R/\equiv Cert_S(\Delta t, \text{Statement})\ \text{and}\ R/\equiv S/\sim m_1: R/\equiv (\xi(m_1, S), K^{-1}{}_{CA}) \quad (15)$$

Consequently, for the message $M_2$. in second round, S verifies the certificate signature in $Cert_R$. By applying the assumptions A1, A2, A5, A6 with the Message meaning rule given in Equation 1, S believes that the CA said $Cert_R$ ($\Delta t$, Statement).

$$\frac{S /\equiv \zeta K(CA, K_{CA}), S /\equiv {}^n(CA, K_{CA}^{-1}),\ S <1\ (\zeta\ \{Cert_R(\Delta t, \text{Statement}), K_{CA}^{-1}\}R\}}{S /\equiv CA /\sim Cert_R(\Delta t, \text{Statement})} \quad (16)$$

Now, using Equation 16 with the Message meaning rule given in Equation 3, S believes that the CA believes in the Statement from R. Apparently, second order belief is accomplished in Equation 17.

$$\frac{S /\equiv CA/\sim(Cert_R(\Delta t, \text{Statement})), S /\equiv CA /\equiv \Delta t, S /\equiv CA /\equiv \phi\ (\text{Statement})}{S /\equiv CA /\equiv \text{Statement}} \quad (17)$$

Next, the Decomposition rule given in Equation 6 is combined with Equation 17. It derives that if CA believes in Statement then it also believes in the $Cert_R$ as follows.

$$\frac{CA /\equiv \blacklozenge(\text{Statement})}{CA /\equiv \blacklozenge(Cert_S(\Delta t, \text{Statement}))} \quad (18)$$

Applying Jurisdiction rule given in Equation 5 with the current Equation 18 and assumption A11.

Now, S also believes in the $Cert_R$. The following equation yields a first order belief of S.

$$\frac{S \mid\equiv CA \Rightarrow Cert_R(\Delta\ t, Statement), S \mid\equiv CA \mid\equiv Cert_R(\Delta\ t, Statement)}{S \mid\equiv Cert_R(\Delta\ t, Statement)} \quad (19)$$

Therefore, S believes in certificate credentials of R, thereby satisfies the goal G2. Now, S verifies the signature on message $m_2$ along with the certificate $Cert_R$. The message $m_2$ contains an explicit identifier for the intended recipient S. Therefore, S derives that the R said message $m_2$ and that it was intended for S.

$$\frac{S \mid\equiv \zeta K(R, K_R), S \mid\equiv\ ^n(R, K_R^{-1}), S \triangleleft 1\ \sigma(TR(m_2, S), K_R^{-1})}{S \mid\equiv\ R \mid\sim m_2} \quad (20)$$

Unlike the first round $M_1$ in the second round $M_2$, S receives his sequence number as an identifier to ensure that S is the intended recipient and R is the intended sender for $m_2$. Now, combining Equation 20 with the first order and second order belief derived in Equations 19, 17, respectively.

Hence, satisfies the goal G4.

$$M_2: S/\equiv CA/\equiv Cert_R(\Delta t, Statement) hence, S/\equiv Cert_R(\Delta t, Statement)\ and\ S/\equiv R/\sim m_2: S/\equiv \sigma(TR(m_2,S), K^{-1}_{CA}) \quad (21)$$

Hence, satisfy goals G3 and G4 as derived in the Equation 15, 21, S believes that R said $m_2$ and similarly, R believes that S said $m_1$.

Claim 7.1 No Passive Adversary can Overhear Messages Between the Intended Sender and Receiver. Proof.

In the initial two rounds of communication messages are exchanged over a directed laser beam. Hence, due to the physical constraints and directed point-to-point characteristic of the laser beam a passive adversary may not be able to overhear the messages that were directed to some other recipient. Therefore, it is impossible for an adversary to record the messages from a laser beam (directed to some other vehicle) and still allowing the beam to arrive at the intended receiver. Moreover, the communication over the radio wireless channel is encrypted with the session key that is derived independently at both sides. Hence, the passive overhearing is not possible over the laser authentication channel.

Claim 7.2 No Active Proxy Adversary can Simply Forward Messages to the Intended Sender or Receiver, in Order to Impersonate Transparently.

Proof.

In the first round goal G1 is satisfied as per Equation 13. Therefore, the intended receiver R believes in the correctness of certified coupled static attributes and public key from S. In addition, Equation 14 satisfies the goal G3. Hence, intended receiver R believes in the correctness of authentication message $m_1$ and that it is coupled with the certificate $Cert_S$ from intended sender S. Similarly, for second round Equation 19 fulfills the goal G2. Now, intended receiver S believes in the correctness of certificate from intended sender R. In order to confirm that the adversary does not replay the messages between intended S and R, receiver S must qualify the goal G4 formalized in Equation 20. S confirms the origin according to the goal G2, next, it confirms that S is the actual intended recipient and it finds its own sequence number in the signatures generated at the intended sender R. Therefore, the formalization of goal G4 and G2 completes the authentication between S and R in two rounds. It is important to mention that the qualification of goal G2 and G4 is crucial to complete the authentication. The second round completes only if the G4 is satisfied that clearly verifies the intended recipient as well as the message confidentiality. Hence, the active proxy adversary cannot misdirect the communication without being detected.

Claim 7.3 No Active Adversary can Derive the Session Key without Holding the Ephemeral Secret Key Exponents. Proof.

An active adversary cannot modify or retrieve the contents of the past recorded messages. The associated authentication message $m_1$ and $m_2$ ensures the session key integrity and avoids any Key Compromise Attack. The authentication message m is comprised of ephemeral secret key eSK along with the long term secret key SK hashed together. Moreover, the session key at R is derived using the ephemeral and long term secret key, i.e., $eSK_R$ and $SK_R$ along with the public key $PK_S$ and $g^{H1}(eSKS, SKS)$. In addition, an independent hashing algorithm $H_2$ is used to generate the one way exponent known as session key $K_R$. Therefore, the session key derivation is impossible at an active adversary not holding these ephemeral exponents. Hence, the active adversary cannot modify or retrieve the messages between sender and receiver.

8 Conclusion

We presented a vehicle authentication scheme based on static and dynamic attributes. The spontaneous vehicle authentication is accomplished through an auxiliary authentication channel. A focused laser beam is used to verify the vehicle dynamics as well as to transmit the certified attributes of the vehicle. We use the fact that every vehicle occupies a unique combination of dynamic attributes such as location, distance, velocity and direction. Moreover, the proposed scheme considers a new attack scenario with multiple identical vehicle. In addition, we illustrate the binding between the proposed scheme and existing authentication protocols. Furthermore, BAN Logic derivation is presented for the security analysis of the proposed approach.

REFERENCES

1. Dedicated Short Range Communications (DSRC) Concept of Operations and ISO Layer Implementation Summary available at URL: http://grouper.ieee.org/groups/scc32/Attachments.html.
2. O. Abumansoor and A. Boukerche. Preventing a dos threat in vehicular ad-hoc networks using adaptive group beaconing. In *Proceedings of the 8h ACM symposium on QoS and security for wireless and mobile networks*, 2012.
3. M. Beigl. Point & click—interaction in smart environments. In *Handheld and Ubiquitous Computing*, 1999.
4. K. Bonne Rasmussen and S. Capkun. Implications of radio fingerprinting on the security of sensor networks. In *Security and Privacy in Communications Networks and the Workshops, 2007. SecureComm 2007. Third International Conference on*.
5. M. Burrows, M. Abadi, and R. Needham. A logic of authentication. *ACM Trans. Comput. Syst.*, 1990.

6. R. Canetti and H. Krawczyk. Analysis of key-exchange protocols and their use for building secure channels. In *Advances in Cryptology EUROCRYPT* 2001.
7. M. K. Chong and H. Gellersen. Usability classification for spontaneous device association. *Personal Ubiquitous Comput.*, 2012.
8. W. Diffie and M. Hellman. New directions in cryptography. *Information Theory, IEEE Transactions on*, 1976.
9. S. Dolev, L. Krzywiecki, N. Panwar, and M. Segal. Certificating vehicle public key with vehicle attributes. In ASCoMS (*Architecting Safety in Collaborative Mobile Systems*) at *SAFECOMP* 2013.
10. H. Hartenstein and K. Laberteaux. A tutorial survey on vehicular ad hoc networks. *Communications Magazine, IEEE*, 2008.
11. E. Hossain, G. Chow, V. C. M. Leung, R. D. McLeod, J. Mišić, V. W. S. Wong, and O. Yang. Vehicular telematics over heterogeneous wireless networks: A survey. *Comput. Commun.*, 2010.
12. J. D. Howard and T. A. Longstaff. A common language for computer security incidents, 1998.
13. T. Kindberg and K. Zhang. Secure spontaneous device association. In *Ubiquitous Computing.* 2003.
14. K. Koscher, A. Czeskis, F. Roesner, S. Patel, T. Kohno, S. Checkoway, D. McCoy, B. Kantor, D. Anderson, H. Shacham, and S. Savage. Experimental security analysis of a modern automobile. In *In IEEE Symposium on Security and Privacy (SP)*, 2010.
15. H. Krawczyk. Sigma: The 'sign-and-mac' approach to authenticated Diffie-Hellman and its use in the ike-protocols. In *CRYPTO*, 2003.
16. A. Kumar, N. Saxena, G. Tsudik, and E. Uzun. A comparative study of secure device pairing methods. *Pervasive and Mobile Computing*, 2009.
17. B. LaMacchia, K. Lauter, and A. Mityagin. Stronger security of authenticated key exchange. In *Provable Security.* 2007.
18. J. Lee and J. H. Park. Authenticated key exchange secure under the computational diffie-hellman assumption. *IACR Cryptology ePrint Archive*, 2008.
19. U. M. Maurer and S. Wolf. The relationship between breaking the diffie-hellman protocol and computing discrete logarithms. *SIAM J. Comput.*, 1999.
20. R. Mayrhofer and M. Welch. A human-verifiable authentication protocol using visible laser light. In *Availability, Reliability and Security*, 2007.
21. J. McCune, A. Perrig, and M. Reiter. Seeing-is-believing: Using camera phones for human-verifiable authentication. In *Security and Privacy, 2005 IEEE Symposium on.*
22. L. H. Nguyen and A. W. Roscoe. Authentication protocols based on low-bandwidth unspoofable channels: A comparative survey. *J. Comput. Secur.*, 2011.
23. P. Papadimitratos, L. Bunyan, T. Holczer, E. Schoch, J. Freudiger, M. Raya, Z. Ma, F. Kargl, A. Kung, and J.-P. Hubaux. Secure vehicular communication systems: Design and architecture. *Communications Magazine, IEEE*, 2008.
24. S. Patel and G. Abowd. A 2-way laser-assisted selection scheme for handhelds in a physical environment. In *Ubiquitous Computing*, Lecture Notes in Computer Science. 2003.
25. F. Ponte Miler, L. Navajas, and T. Strang. Characterization of a laser scanner sensor for the use as a reference system in vehicular relative positioning. In *Communication Technologies for Vehicles.* 2013.
26. M. Raya and J.-P. Hubaux. The security of vanets. In *Proceedings of the 2nd ACM international workshop on Vehicular ad hoc networks*, 2005.
27. M. Raya and J.-P. Hubaux. Securing vehicular ad-hoc networks. *Journal of Computer Security*, 2007.
28. M. Ringwald. Spontaneous interaction with everyday devices using a pda, 2002.
29. A. San, P. Elbaz-Vincent, and J.-C. Bajard. A new security model for authenticated key agreement. In *Security and Cryptography for Networks.* 2010.
30. M. Sichitiu and M. Kihl. Inter-vehicle communication systems: A survey. *Communications Surveys Tutorials, IEEE*, 2008.
31. Sufatrio and R. H. C. Yap. Extending ban logic for reasoning with modern pki-based protocols. In *IFIP International Conference on Network and Parallel Computing*, 2008.
32. L. Ulrich. Whiter brights with lasers. In *IEEE Spectrum*, 2013.
33. B. Ustaoglu. Obtaining a secure and efficient key agreement protocol from (h)mqv and naxos. *Designs, Codes and Cryptography*, 2008.
34. T. Yashiro, T. Kondo, K. Ariyasu, and Y. Matsushita. An inter-vehicle networking method using laser media. In *Vehicular Technology Conference, IEEE* 44th, 1994.

System and Hardware Setting

Light Amplification by Stimulated Emission of Radiation (LASER).

Laser is a coherent light beam. It exhibits the spatial and temporal coherence that enables the generation of a narrow light beam over the longer distances. Moreover, the data carrying capacity of a laser out-of-band channel is appropriate for the secure data communication.

It requires less transmission power in a directed/focused light beam over the longer distances, e.g., a 0.4 milliradian cone may travel up to 300 meter to illuminate 1 meter2 space.

It provides more bandwidth and bit carrying capacity, e.g., up to 26 Terabytes per second, see

FIG. 15.

It does not suffer with the frequency interference issues, as the wireless radio signals do.

It provides a wide detection range with low divergence and high reliability, e.g., up to 1600 meter for toward and egress both directions of beam pointing at a specific receiver.

Laser and radio transmission both travel at the speed of light, still lasers can carry more data at lower power consumption, e.g., 1-20 Watt for the solid state laser beam.

The laser diode is much compact and easy to install, e.g., overall active area is 1/10,000 of the area used by light emitting diode setup. It can also be aided with fiber optics, hence, the vehicle body weight does not require a redistribution.

e spectrum analyzer.

enging as it cannot be used in foggy weather

Light Detection and Ranging (LIDAR).

LIDAR is a prominent application of the laser beam for vehicle speed monitoring. In some part of the Europe, LIDAR guns are frequently used by the police for the vehicle tracking. It works on the principle of time-of-flight. It determines the vehicle speed by measuring doppler shift, i.e., the change of wavelength caused by the object movement. If a vehicle A is moving on velocity $v_A$ and the light beam travelling at speed c takes a round trip flight time $t_1$, then current distance $D_1$ between the vehicle and the light beam source can be calculated as follows:

$$D_1 = t_1 \times c; D_2 = t_2 \times c \quad (22)$$

For the multiple measurements, in Equation 22, such as flight time $t_1$, $t_2$ and distance $D_1$, $D_2$ yields the resultant time interval $\Delta t = t_2 \ldots t_1$ and distance traveled $\Delta D = D_2 - D_1$.

$$v_A = \Delta D \div \Delta t \quad (23)$$

Therefore, velocity $v_A$ of vehicle A over the distance $\Delta D$ in time $\Delta t$ can be calculated (see Equation 23) at the source vehicle pointing the laser beam, e.g., a 1 KHz pulse at 50 mW for 30 ns takes 1/250 s on average to calculate the target speed. However, we emphasize on using the laser beam for vehicle identification, i.e., binding the vehicle identity (location) with the physical presence (license number, color).

Autocollimator.

We consider that along with the vehicle location tracking, the target surface angle is also a relevant dynamic attribute. Therefore, we assume that vehicles utilize the same laser out-of-band channel for the vehicle location tracking and direction verification. In order to be precise concerning the direction measurements, laser devices are accompanied with the optical autocollimator. Autocollimator eyepiece detector setup never comes into contact with the target object surface. It is most commonly used for the surface parallelism/perpendicularity measurement. There exists multiple variants of autocollimators such as video (a combination of autocollimator and telescope), visual, digital (optical head with digital controller) and laser beam equipped autocollimators.

Figure 16:
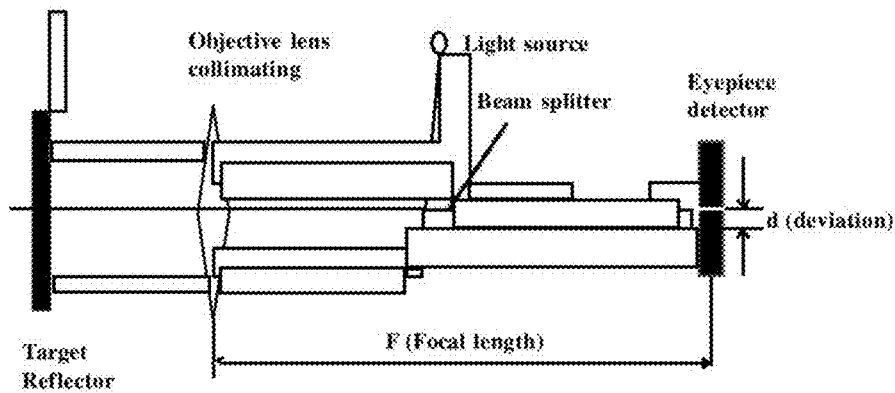
FIG. 16 shows an autocollimator that measures the target surface angle, using a collimated light beam.

Description. It is an optical device that measures the target surface angle using a collimated light beam, see FIG. 16. A collimated light beam is an aligned narrow beam with negligible divergence in the environment, therefore, the beam can travel over larger distances. Light rays start from a light source and reflects from the beam splitter, towards the collimating lens. Collimating lens directs the beam towards the target object. The light rays reflect back from the target object and travel the same path towards the eyepiece detector. If the target object is perpendicular to the horizon, then the reflected light beam intersects at the center of eyepiece detector. Now, the variation in light beam reflection corresponding to the target object angle deviation from the y-axis can be measured, relatively.

$$d = \Theta \times f \quad (24)$$

If the target object is tilted at angle $\Theta$ from y-axis, then the light beam reflects back towards the eyepiece detector at angle $2\Theta$. This angle $\Theta$ can be measured through the focal length $f$ of the collimating lens and the light beam deviation d from the center of eyepiece detector, see Equation 24.

Vehicles Non-Routable Authentication based on Optical PUF

Introduction

Vehicle networks [8, 22] allows a safe and efficient maneuvering among the vehicles. Smart vehicles are equipped with wireless radio device [11] and comply with the standard Dedicated Short Range Communication and Wireless Access in Vehicular Environment (WAVE) IEEE1609. In [9], ultrasonic and infrared radar, optical detection and ranging sensors and night vision camera. Therefore, vehicles are customized to predict a crash event ahead of time. However, these warning messages do not possess an authentication factor as to verify the source of warning message and react accordingly. Our work in this paper illustrates the use of optical PUF devices in order to generate the challenge and the corresponding response at sender and receiver, respectively.

Problem Statement.

We consider adversary coalition scenario in vehicle networks. Accordingly, adversaries forward the messages between intended sender and receiver, without decrypting the messages. Sender and receiver verify the visual attributes and the location, however, it cannot identify that the actual sender/receiver is far away, and the messages are routed through a group of malicious vehicles that looks similar as the intended sender/receiver. Therefore, the authentication based on visual attribute binding with the public key and the location is not sufficient for this scenario. Adversary coalition scenario requires non-forwardable authentication techniques—such that prevents the verifier to visually misidentify the attacker (that only forwards messages) with the original authenticator (that produces the authentication messages). To overcome this problem we focus on solutions based on Physical Unclonable Functions (PUFs) that are used as unforgeable fingerprints [2] for messages exchange between vehicles.

Physical Unclonable Function (PUF).

PUF is a hardware primitive that extracts secrets from its physical characteristics acquired during inevitable random variation of fabrication process. Structural variations present in PUFs provide they cannot be cloned exactly, even by its original manufacturer. PUFs can be tested with external challenges, upon which (due to PUFs perplex structure) they react with corresponding responses which are extremely difficult to predict and are unique to each PUF.

There are several types of PUFs discussed in literature: Strong PUFs [18],[6],[7]. Controlled PUFs [5], Weak PUFs [7]. Strong PUFs, also referred to as Physical Random Functions [4],[6] or Physical One-Way Functions [17],[18], are hardware devices with very many possible challenge-response pairs (CRPs). Their requirements are: infeasibility of physical cloning, impossibility to determine all CRPs by any adversary who has unrestricted access to the tested PUF, infeasibility of response prediction for a randomly chosen challenge given a collection of previous CRPs.

There are number of candidates for Strong PUFs implemented on integrated circuits proposed however the efforts in this area must be continued due to modeling attacks [21]. In the meantime Strong PUF features has been used for key establishment [18],[24], identification [18] and authentication [6].

Previous Work.

The Physically Unclonable functions (PUF) was first introduced in [19] as a hardware analogous to the one-way hash functions. The authors in [23] proposed the PUF devices for authentication purpose. The state-of-art PUF applications that ensures the property of unclonability is given in [14, 10]. Moreover, the work in [1] presents the PUF assisted formal security features. A broadcast encryption scheme based on PUF devices is given in [12] that supports anonymity and secret cloning resistance. Furthermore, the authors in [20] presented an optical PUF based scheme for challenge-response verification through a manufacturers signature embedded over the PUF device. Our previous work in [3] presents a vehicle authentication scheme based on certified and coupled attributes with the public key, therefore, requires an out-of-band communication channel to verify the vehicle attributes. In the following work we proposed the use of laser communication channel for the dynamic attribute verification. The utility of laser auxiliary channel in association with the secure device authentication can be found in [15, 13, 16].

Our Contribution

- Unique identification: the proposed approach ensures the unique identification of the peer vehicle in communication.
- Vehicle authentication: as the physical challenge stimulus C from sender vehicle must be processed at the corresponding receiver, in order to generate original and spontaneous PUF response R. Receiver must couple the freshly generated response R along with the certified response CertR, in order to prove the correct challenge-response binding.
- Information theoretically secure: as the challenge-response pairing is one-to-one correspondent and that the adversary cannot guess or derive the response bits ahead of time, through any means, except that the challenge bits are actually processed on an authentic PUF device.
- Non-Forwardability: as the adversary cannot forward the messages on behalf of another sender, i.e., without being detected. Sender and receiver are in direct communication with each other, therefore the message integrity is ensured.

Outline.

We consider the adversary coalition attack scenario in Section 2. A detailed description of the PUF assisted vehicle authentication approach is given in Section 1 Furthermore, security discussion regarding the authentication approach is considered in Section 4. The Section highlights the concluding remarks

2 Adversary Coalition Scenario

Figure 17:
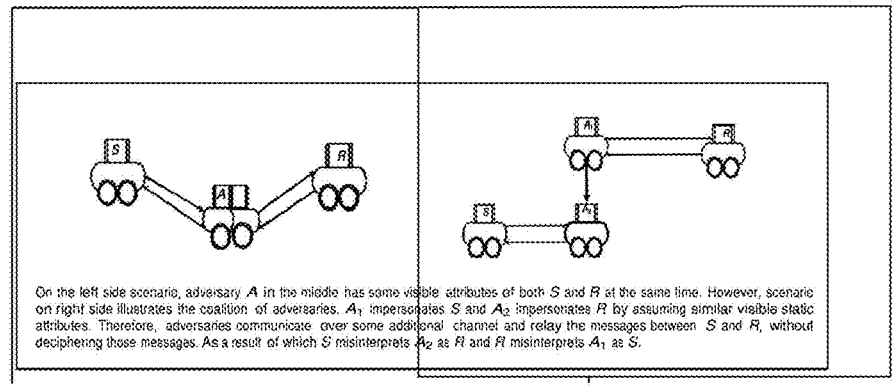
FIG. 17 shows an adversary coalition scenario.

We are considering the coalition attack scenario in this paper, see FIG. 17. According to the coalition scenario, there exists two or more malicious vehicles between the sender and the receiver. One of these malicious vehicles impersonates sender and the other impersonates receiver by carrying exactly similar static attributes. Moreover, these malicious vehicles communicate over a separate communication channel to relay the messages between actual sender and receiver. Although malicious vehicles may not be able to decipher the messages, however, malicious vehicles can create an illusion of correct visual binding. The sender believes that it forwards message to receiver while actually forwarding it to one of the malicious vehicle impersonating the receiver and vice versa.

It must be noticed that coalition scenario cannot be avoided with the regular configurations. Broadcast channels (such as radio, WiFi) or even point-to-point channels (laser, directed microwaves) do not inherently prevent message forwarding. Therefore additional assumptions are required.

In order to mitigate this coalition attack scenario and to identify the recipient vehicle (while keeping the directed nature of the channel), we plan to utilize the PUF assisted authentication in this paper.

Strawmen Solutions. To give intuition we present here some ad-hoc solutions that potentially seems to immune against coalition scenario however have some drawbacks.

3 Physical Unclonable Function Assisted Authentication

Typical usage of PUF in authorization process is divided into two phases:

1. Setup phase:
   (a) a PUF device is tested against the vector of challanges $C=(c_1, c_2, \ldots, c_i, \ldots, c_n)$ outputting the vector of responses $R=r_2, r_2, \ldots, r_i, \ldots, r_n)$
   (b) C and R are stored securely and secretly on the verifier side.
   (c) the PUF is given to the user
2. Authentication phase:
   (a) A Puf holder inserts the PUP into the PUF reader
   (b) The PUF is challenged against the challenge $c_t$
   (c) If the answer from the PUF is equal to the corresponding response $r_t$ previously stored, then the authenticator is accepted.

For the purpose of our proposition we consider optical PUF devices.

Regular Setup.

Figure 18:
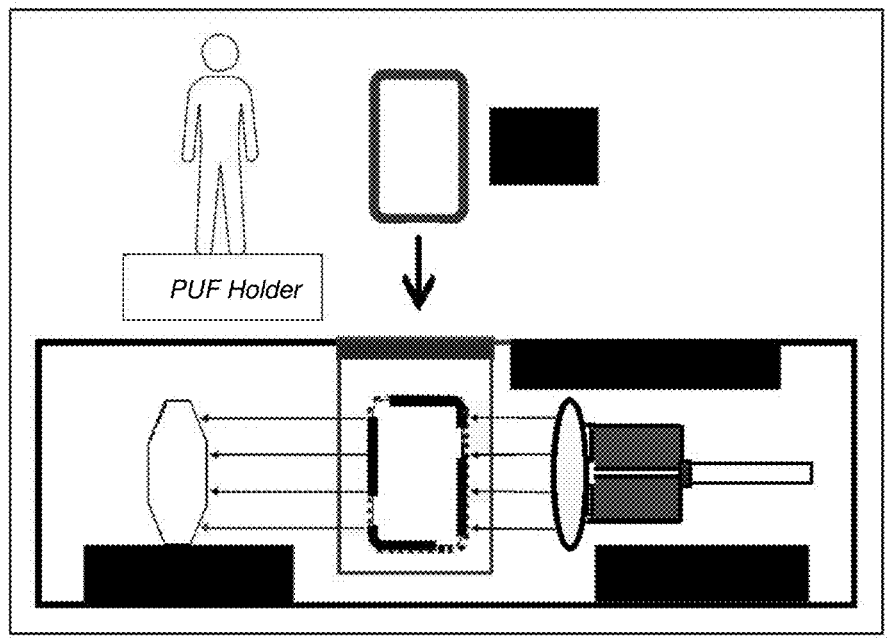
FIG. 18 shows a regular setup of an optical PUF in a form of a user card with a transparent film.

In regular setup the optical PUF can have a form of a user card with a transparent film. The film itself is neither crystal-clear nor super smooth. Instead it is covered with a random micro-roughness introduced during its production (e.g. the film is sprayed with micro particles that destroyed its outer layer). When a user authenticates, it inserts the card into the reader. Then the laser beam, modulated according to the recoded i-th challenge $c_i$, goes though the film, and the resulting scattered speckles are captured on the sensor part of the reader (see FIG. 18).

Vehicles Setup.

Figure 4:
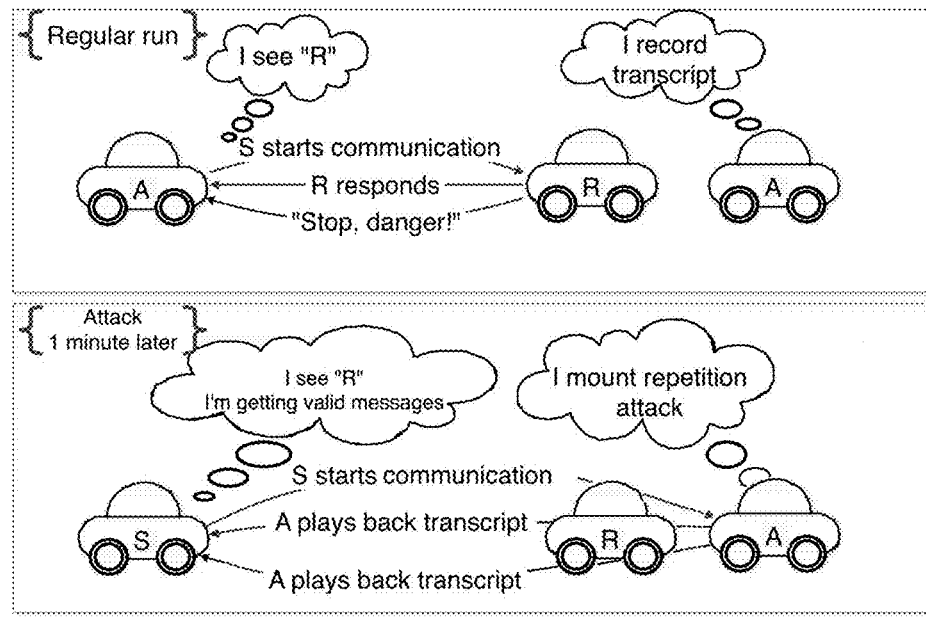

For the vehicles we modify the regular setup in the following way:

- The part of the reader device made of "puf" slot (with the PUF inserted inside) and the necessary optics are mounted into the responder vehicle as the authenticator's part.
- The part of the reader made of the laser and the sensor are mounted into the responder vehicle divide, are mounted into the sender vehicle as the verifier's part (see FIG. 3).

Model of the Proccessing.

In the rest of the paper we refer to the process of obtaining the i-th numeric challenge, modulation, speckles and numeric response, respectively denoted as $c_i$, $m_i$, $s_i$, $r_i$. We describe the process in the following way:

- The modulation $m_i$ is done via a deterministic function $f$ that codes the numeric value of the challenge $c_i$ into a combination of beam frequencies and angles; we denote: $f(c_i) \rightarrow m_i$.
- The PUF converts the modulated light $m_i$ into the scatered speckles $s_i$; we denote:

$PUF(m_i) \rightarrow s_i$.

- The output from the PUF (as the light speckles $s_i$) is captured via the specialized screen. The speckles pattern is decoded into numeric value $r_i$; we denote: $g(s_i) \rightarrow r_i$
- This value is compared against the previously recorded and stored response.

Here we stress that the input $s_i$ processed by the sensor is physical characteristic of the scattered light (rather than a "flat" two dimensional image of it). The difference is like processing the hologram, versus processing a "photo" of the hologram (e.g. taken by regular camera). We can assume that the sensor is tuned to capture only the predefined physical characteristics s—not anything else.

As common assumption, we presume that producing the clone of the given PUF is impossible due to physical limitation of any attacker. So producing the correct vector $r_1, \ldots r_n$ corresponding to the given $c_1, \ldots c_n$ is impossible from definition without the original PUF. We formulate the following assumption:

Assumption 1 (PUF Assumption)

Each physical unclonable function (PUF) device realizes a separate and distinct instance of the random oracle model for a hash function.

The consequences of the assumption:

There is a separate table of input-output pairs $\{(m_1, s_i)\}$ associated with each PUF device, empty at the end of the production stage, initialized on its first run and maintained throughout its lifetime. Every time the PUF is tested upon a new distinct input, it returns a new random output and the pair is stored in its table. For inputs previously queried the outputs are consistent with the pairs recorded to the table.

The outputs are unpredictable, unless PUF has already been used for a given input.

The PUF cannot be cloned in such a way that after cloning the answers for unqueried inputs would be consistent between the clones.

Moreover we assume that capturing and intentional reproducing the one chosen scattered optical output $s_i$, which later on could be retransmitted to another receiver then decoded there into the required numeric value of the response $r_i$, should be negligible in the reasonable time, without the original PUF that produced $s_i$ for the corresponding $m_i$. The term reasonable time refers to the attack model that allows the attacker to reproduce such an scattered optical speckles s for some response r in carefully prepared laboratory environment, but generally prevents such an attack, as infeasible, in real life ad-hoc scenarios. In other words we assume that it is impossible to produce the vector of scattered patterns $s_1, \ldots s_n$ for the given vector $r_1, \ldots r_n$, without the original PUF and without input $c_1, \ldots c_n$. Actually this is a very similar assumption as presented in [20].

Assumption 2 (Non-forward-ability PUF answers—Fingerprints)

For a given PUF process:

$c_i$, $m_i \leftarrow f(c_i, s_i \leftarrow \mathrm{PUF}(m_i), r_i\ g(s_i)$ there is no adversary that can re-route the PUF's output $s_i$ without possessing original PUF imputed by the respective challenge $m_i$, due to physical characteristics of PUF and $s_i$ themselves.

Notations, Notations are given in Table 2.

Assumptions and Settings.

Every vehicle possesses a PUF device from the trusted manufacturer.

Vehicles carry certified coupling for the challenge response pair, i.e., $\mathrm{Cert}(R_t)$.

Vehicle switch on a wireless mode of communication after the PUF assisted challenge-response verification.

Certificates are valid only for the prescribed time interval t and can be discarded after the one-time use.

Vehicles PUF Installment.

Overview.

Figure 19:
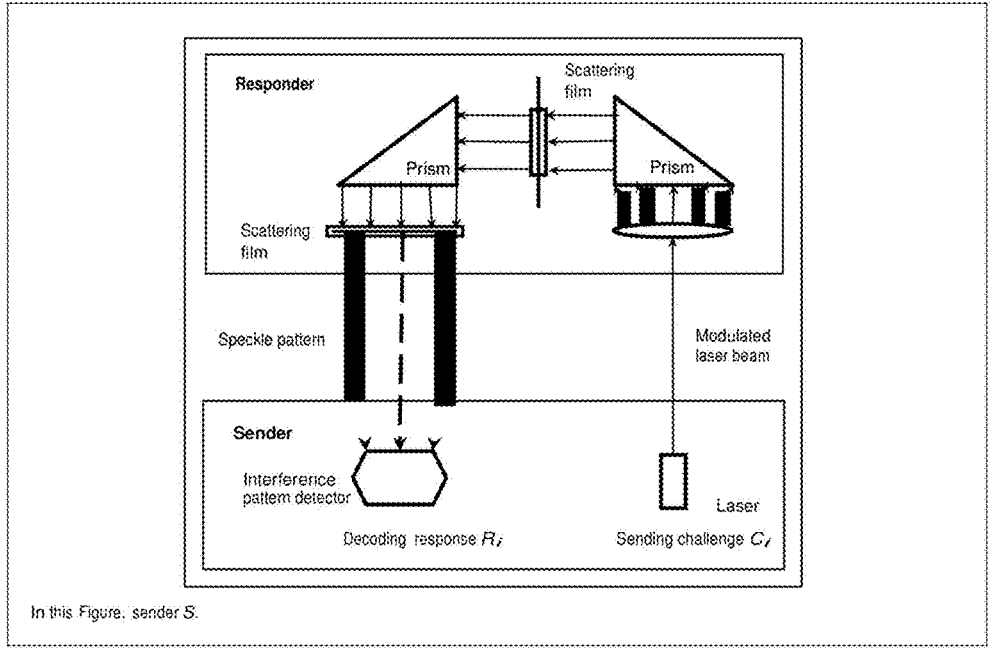
FIG. 19 shows the whole protocol construction, utilizing binding between optical and radio communication.
Figure 20:
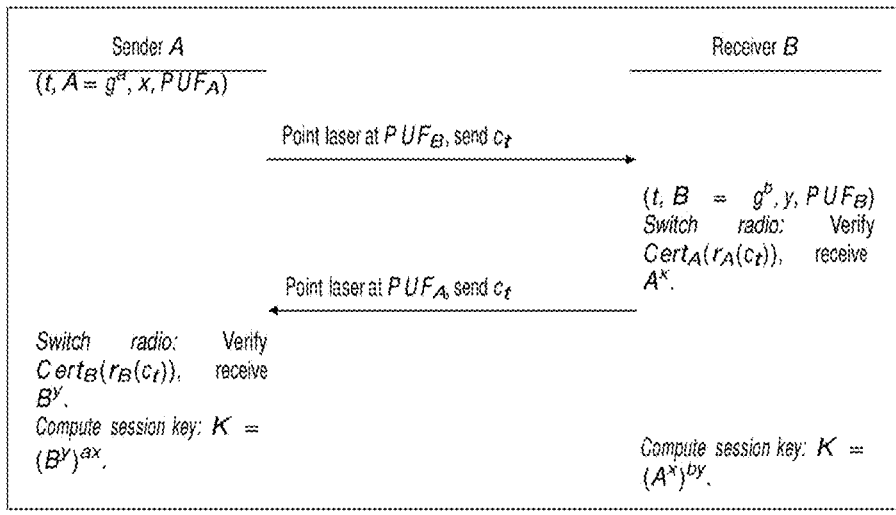
FIG. 20 shows a temper proof PUF device setup and the registration phase.

Initially, communicating vehicles utilize laser and PUF devices for identification purposes. The interaction between a modulated laser beam and the PUF device is to convey the challenge-response bits among them. The whole protocol construction in FIG. 19 will utilize binding between two channels, i.e., optical and radio communication, respectively for the challenge-response bits and other messages, e.g., certificates. After the session key derivation is done at both vehicles, vehicles may switch on to a wireless communication session. A general working of the proposed approach is given in FIG. 20.

Proposed Approach.

We describe the temper proof PUF device setup and the registration phase as following.

TABLE 2

Notations.

| | | | |
|---|---|---|---|
| Receiver | R | Sender | S |
| Certificate of receiver | C | Certificate of sender | CertS |
| Response at time t | rt | Challenge at time t | ct |
| Ephemeral secret key of R | y | Ephemeral secret key of S | x |
| Long term public key of R | $g^b$ | Long term public key of S | $g^a$ |
| Session key | K | Time stamp | t |
| | | Public hash algorithm | Hash |

Setup: In this phase every vehicle is configured with a long term public key in a temper proof storage and the PUF device. For example, vehicle A is configured with long term public key $A=g^a$ and the PUF device $\mathrm{PUF}_A$. Similarly, vehicle B has long term public key $B=g^b$ and the PUF device $\mathrm{PUF}_B$.

Registration: This phase enables a periodic registration of the vehicles at the prescribed authorities. Registration authority $\phi$ with the secret key $\mathrm{SK}_{?R}$ coins a pseudo-random set of challenges, i.e., $(c_1, c_2, \ldots, c_t, \ldots, c_n)$ where $c_t$ is for each time interval t until the next registration period such as $c_t = \mathrm{Hash}(\mathrm{timestamp}_t)$. Therefore, the cardinality is assumed to be of the order of per second interval for the period of registration. Furthermore, during the registration phase of a vehicle A, authority R processes every $c_t$ in the set of challenges with the configured $\mathrm{PUF}_A$ device. In order to obtain the direct optical speckle interference response from PUF device for every challenge $c_t$ within the set. In addition, $\phi$ processes the direct optical speckle pattern and decodes it into a numeric response value $r_A(c_t)$. Now, $\phi$ certifies the processed numeric response as $\mathrm{Cert}_A(c_t)$ for the corresponding challenge $c_t$ and configures the vehicle to use this certified response during authentication phase. For example $\phi$ stores the certificates $(\mathrm{Cert}_A(c1), \ldots, \mathrm{Cert}_A(c_t), \ldots, \mathrm{Cert}_A(c_n))$ of the vehicle A on a SD card.

Authentication and Session Key Exchange: This phase considers the interaction among the moving vehicles after the registration and public key configuration is completed. As the challenge set is based on time stamps, therefore, vehicles are able to compute the challenge $c_t$ for prescribed time interval. For example, vehicle A with the long term public key $A=g^a$ coins ephemeral secret x before the communication starts. A directs the laser beam towards the $\mathrm{PUF}_B$ of the target vehicle B. Subsequently, A sends modulated challenge $c_t$ via laser beam to the $\mathrm{PUF}_B$. Concurrently, A sends the certified response altogether with the ephemeral public key $A^x$ over the radio channel.

Similarly, vehicle B with the long term public key $B=g^b$ coins ephemeral secret y. Vehicle B points the laser at the $\mathrm{PUF}_A$ of the initiator vehicle A. Furthermore, B sends modulated challenge $c_t$ via laser beam for $\mathrm{PUF}_A$. Consequently, B records the optical speckle response from $\mathrm{PUF}_A$ and decodes the numeric response $r_A(c_t)$ after processing this speckle pattern. Next, B receives the certificate $\mathrm{Cert}_A(c_t)$ for $r_A(c_t)$ altogether with public ephemeral key $A^x$ over the radio channel from A. B verifies that $\mathrm{Cert}_A(c_t)$ for the numeric response $r_A(c_t)$ should be valid. Once the certifies response is verified against the measures numeric response, B computes the session key $K=(A^x)$ by using ephemeral public key of A. a numeric response value $r_B(c^t)$. Concurrently, A receives the certified response $\mathrm{Cert}_B(c_t)$ corresponding to numeric response $r_B(c_t)$ altogether with the ephemeral public key $B^y$ via radio channel. A verifies the validity of certified response $Cert_B(c_t)$ against the measured numeric response $r_B(c_t)$. After the certificate verification A computes the session key $K=(B^y)^{ax}$ using ephemeral public key of B.

4 Security Discussion

We assume that producing the optical speckle response $r_A(c_t)$ for the paired challenge $c_t$ is impossible, without using the corresponding PUF device $PUF_A$. Sender has to process the optical speckle response itself to compute the final numeric response value $r_A(c_t)$ locally. However, receiver might receive an already decoded final numeric response $r_A(c_t)$ from the peer vehicle and considers it an attack. Therefore, it is clear that the challenge $c_t$ need not to be a secret.

The following claims are true after the successful completion of authentication between two vehicles.

Visual binding: both vehicles are sure what they see.
Secure session key derivation: both vehicles compute the same session key $K=g^{axby}$. Also the session keys are unique for each session and immune to ephemeral secret leakage (and other similar functionalities as in ECK model).

5 Conclusion

References

1. F. Armknecht, R. Maes, A. Sadeghi, O.-X. Standaert, and C. Wachsmann. A formalization of the security features of physical functions. In *Security and Privacy (SP)*, 2011 IEEE Symposium on, 2011.
2. K. Bonne Rasmussen and S. Capkun. Implications of radio fingerprinting on the security of sensor networks. In *Security and Privacy in Communications Networks and the Workshops*, 2007. SecureComm 2007. Third International Conference on.
3. S. Dolev, Ł. Krzywiecki, N. Panwar, and M. Segal. Certificating vehicle public key with vehicle attributes. In *ASCoMS (Architecting Safety in Collaborative Mobile Systems) at SAFECOMP* 2013.
4. B. Gassend. Physical Random Functions. Master's thesis, MIT, USA, 2003.
5. B. Gassend, D. Clarke, M. van Dijk, and S.-Devadas. Controlled Physical Random Functions. In *Proc. of the 18th Annual Computer Security Applications Conference*, December 2002.
6. B. Gassend, D. E. Clarke, M. van Dijk, and S. Devadas, Silicon physical random functions. In V. Atluri, editor, *ACM Conference on Computer and Communications Security*, pages 148-160. ACM, 2002.
7. J. Guajardo, S. S. Kumar, G. J. Schrijen, and P. Tuyls. Fpga intrinsic pufs and their use for ip protection. In P. Paillier and I. Verbauwhede, editors, *CHES*, volume 4727 of LNCS, pages 63-80. Springer, 2007.
8. H. Hartenstein and K. Laberteaux. A tutorial survey on vehicular ad hoc networks. *Communications Magazine, IEEE*, 2008.
9. E. Hossain, G. Chow, V. C. M. Leung, R. D. McLeod, J. Mišić, V. W. S. Wong, and O. Yang. Vehicular telematics over heterogeneous wireless networks: A survey. *Comput. Commun.*, 2010.
10. S. Katzenbeisser, n. Kocaba, V. Roi, A.-R. Sadeghi, I. Verbauwhede, and C. Wachsmann. Pufs: Myth, fact or busted? a security evaluation of physically unclonable functions(pufs) cast in silicon. In *Cryptographic Hardware and Embedded Systems CHES 2012*. 2012.
11. J. Kenney. Dedicated short-range communications (dsrc) standards in the united states. *Proceedings of the IEEE*, 2011.
12. puf. In *Trust and Trustworthy Computing*. 2011.
13. A. Kumar, N. Saxena, G. Tsudik, and E. Uzun. A comparative study of secure device pairing methods. *Pervasive and Mobile Computing*, 2009.
14. R. Maes and I. Verbauwhede. Physically unclonable functions: A study on the state of the art and future research directions. In *Towards Hardware-Intrinsic Security*. 2010.
15. R. Mayrhofer and M. Welch. A human-verifiable authentication protocol using visible laser light. In *Availability, Reliability and Security*, 2007.
16. L. H. Nguyen and A. W. Roscoe, Authentication protocols based on low-bandwidth unspoofable channels: A comparative survey. *J. Comput. Secur.*, 2011.
17. R. S. Pappu. *Physical one-way functions*. PhD thesis, Massachusetts Institute of Technology, March 2001.
18. R. S. Pappu, B. Recht, J. Taylor, and N. Gershenfeld. Physical one-way functions. Science, 297:2026-2030, 2002.
19. P. S. Ravikanth. Physical one-way functions. *Ph.D. Dissertation, Massachusetts Institute of Technology*, March 2001.
20. U. Rhrmair, C. Hilgers, S. Urban, A. Weiershuser, E. Dinter, B. Forster, and C. Jirauschek. Optical pufs reloaded. Cryptology ePrint Archive, Report 2013/215, 2013.
21. U. Rührmair, F. Sehnke, J. Söfter, G. Dror, S. Devadas, and J. Schmidhuber. Modeling attacks on physical unclonable functions. In E. Al-Shaer, A. D. Keromytis, and V. Shmatikov, editors, *ACM Conference on Computer and Communications Security*, pages 237-249. ACM, 2010.
22. M. Sichitiu and M. Kihl. Inter-vehicle communication systems: A survey. *Communications Surveys Tutorials, IEEE*, 2008.
23. P. Tuyls and B. kori. Strong authentication with physical unclonable functions. In *Security, Privacy, and Trust in Modern Data Management*. 2007.
24. P. Tuyls and B. Š korić. Strong authentication with physical unclonable functions. In *Security, Privacy, and Trust in Modern Data Management*, pages 133-148. 2007.

The invention claimed is:
1. A method for providing secure connection between a first vehicle and a second vehicle over a channel of a wireless communication network, comprising the steps of:
 a) providing to each vehicle, its own unique pair of digitally signed public key and private key;
 b) providing to each vehicle, additional vehicle-related data being a collection of its own visual attributes, at least one of which being an executable procedure, executed by a verifier and monolithically signed with its said own public key, for identifying itself;
 c) for each vehicle, generating its own unique certificate with a unique certificate number, said executable procedure being embedded in said own unique certificate, to identify said each vehicle upon being in communication with another vehicle;
 d) signing monolithic data consisting of said own public key, said certificate number and said visual attributes of said first vehicle by a trusted Certificate generating Authority (CA) that solely restores any manipulations being changes in attributes or in security credentials of said first vehicle;

e) prior to wireless communication between said first vehicle and said second vehicle, performing an out of band verification step of said visual attributes of said first vehicle, during which:
e.1) the signed monolithic data is mutually verified by said second vehicle while exchanging authentication identification session key, simultaneously and in one communication round, where said first vehicle sends its unique certificate to said second vehicle over a communication channel;
e.2) said second vehicle verifies the authenticity of received unique certificate of said first vehicle and its visual attributes by a visual capturing device being capable of capturing attributes of said first vehicle which are visible, using image processing means;
f) if said captured visual attributes are verified successfully via out of band communication, generating a secret session key with neighboring authenticated vehicles for a current session independently at one party, said second vehicle sends its unique certificate to said first vehicle over a communication channel, along with said secret session key, which is valid for the current session only using only two communication rounds;
g) said first vehicle verifies the authenticity of received unique certificate of said second vehicle and its attributes by a visual capturing device, for capturing attributes of said second vehicle which are visible, using signal processing means; and
h) as a result of successful authentication, allowing both vehicles to securely exchange message or data using said secret session key.

2. The method according to claim 1, wherein the collection of each vehicle's attributes includes:
its color;
its world manufacturing identifier;
its license plate number;
its chassis number;
its engine type and number;
its model;
its brand/logo;
the texture of its color;
its body outline;
its racks;
its mud flaps;
its front/rear guards;
its tire tread;
its wireless fingerprints;
its appearance of color body repairs;
procedures to identify its attributes.

3. The method according to claim 1, wherein said communication channel includes:
wireless radio channel;
optical communication channel;
laser or IR communication channel.

4. The method according to claim 3, further comprising verifying dynamic attributes of each vehicle by a laser beam used both to identify the location of said each vehicle and to transfer data over said communication channel.

5. The method according to claim 3, further comprising:
(a) receiving a laser beam including challenge bits transmitted from a source vehicle by a Physical Unclonable Function (PUF) device installed on a destination vehicle;
(b) interacting with said beam and creating a unique optical unclonable pattern;
(c) decoding said optical unclonable pattern and obtaining a numeric response; and
(d) verifying said numeric response against certified challenge-response pairs;
(e) if the verification is successful, allowing communication between vehicles.

6. The method according to claim 1, wherein the signal processing means are image processing means.

* * * * *